United States Patent
Takahashi et al.

(10) Patent No.: US 11,108,105 B2
(45) Date of Patent: Aug. 31, 2021

(54) SECONDARY BATTERY AND ELECTRONIC DEVICE

(71) Applicant: Semiconductor Energy Laboratory Co., Ltd., Atsugi (JP)

(72) Inventors: Minoru Takahashi, Matsumoto (JP); Daisuke Suzawa, Atsugi (JP); Nozomi Uto, Isehara (JP)

(73) Assignee: Semiconductor Energy Laboratory Co., Ltd., Atsugi (JP)

(*) Notice: Subject to any disclaimer, the term of this patent is extended or adjusted under 35 U.S.C. 154(b) by 425 days.

(21) Appl. No.: 14/995,317

(22) Filed: Jan. 14, 2016

(65) Prior Publication Data
US 2016/0218327 A1  Jul. 28, 2016

(30) Foreign Application Priority Data
Jan. 22, 2015  (JP) .............................. JP2015-010559

(51) Int. Cl.
  *H01M 10/00* (2006.01)
  *H01M 50/10* (2021.01)
  (Continued)

(52) U.S. Cl.
  CPC ......... *H01M 50/10* (2021.01); *H01M 50/116* (2021.01); *H01M 10/0525* (2013.01); *H01M 50/183* (2021.01); *H01M 2220/30* (2013.01)

(58) Field of Classification Search
  CPC .... H01M 2/0202; H01M 2/0275; H01M 2/08; H01M 10/0525; H01M 2220/30;
  (Continued)

(56) References Cited

U.S. PATENT DOCUMENTS

| 5,339,091 A | 8/1994 | Yamazaki et al. |
| 5,475,398 A | 12/1995 | Yamazaki et al. |

(Continued)

FOREIGN PATENT DOCUMENTS

| EP | 1202371 A | 5/2002 |
| JP | 2000-173559 A | 6/2000 |

(Continued)

*Primary Examiner* — Nicholas P D'Aniello
(74) *Attorney, Agent, or Firm* — Eric J. Robinson; Robinson Intellectual Property Law Office, P.C.

(57) ABSTRACT

In the case where a film having lower strength than a metal can is used as an exterior body of a secondary battery, a current collector provided in a region surrounded by the exterior body, an active material layer provided on a surface of the current collector, or the like might be damaged when force is externally applied to the secondary battery. A secondary battery resistant to external force is provided. A cushioning material is provided in a region sandwiched by an exterior body of the secondary battery. Specifically, the cushioning material is provided on the periphery of an electrode group including a positive electrode current collector, a positive electrode active material layer formed on at least one surface of the positive electrode current collector, a separator, a negative electrode current collector, and a negative electrode active material layer formed on at least one surface of the negative electrode current collector.

21 Claims, 26 Drawing Sheets

(51) Int. Cl.
    *H01M 50/116*     (2021.01)
    *H01M 10/0525*     (2010.01)
    *H01M 50/183*     (2021.01)

(58) Field of Classification Search
    CPC .. H01M 50/10; H01M 50/116; H01M 50/183; Y02E 60/10
    See application file for complete search history.

(56) References Cited

U.S. PATENT DOCUMENTS

| | | | |
|---|---|---|---|
| 6,743,546 B1 | 6/2004 | Kaneda et al. | |
| 7,864,151 B1 | 1/2011 | Yamazaki et al. | |
| 7,951,480 B1 * | 5/2011 | Skinlo | H01M 2/1673 29/623.1 |
| 8,040,456 B2 | 10/2011 | Yamazaki et al. | |
| 8,218,105 B2 | 7/2012 | Yamazaki et al. | |
| 8,319,725 B2 | 11/2012 | Okamoto et al. | |
| 8,367,440 B2 | 2/2013 | Takayama et al. | |
| 8,415,208 B2 | 4/2013 | Takayama et al. | |
| 8,427,420 B2 | 4/2013 | Yamazaki et al. | |
| 8,634,041 B2 | 1/2014 | Yamazaki et al. | |
| 8,785,030 B2 | 7/2014 | Ueda | |
| 8,884,845 B2 | 11/2014 | Yamazaki et al. | |
| 8,929,085 B2 | 1/2015 | Franklin et al. | |
| 9,929,392 B2 | 3/2018 | Waki et al. | |
| 10,418,611 B2 | 9/2019 | Waki et al. | |
| 10,601,066 B2 * | 3/2020 | Takahashi | H01M 10/0436 |
| 2003/0215709 A1 * | 11/2003 | Hosokawa | H01G 9/08 429/176 |
| 2005/0174302 A1 | 8/2005 | Ishii | |
| 2005/0189906 A1 | 9/2005 | Sun | |
| 2008/0002527 A1 | 1/2008 | Ishii et al. | |
| 2008/0171259 A1 * | 7/2008 | Kanai | H01G 9/016 429/53 |
| 2009/0071952 A1 | 3/2009 | Kuwabara | |
| 2009/0191448 A1 * | 7/2009 | Yamamoto | B29C 70/72 429/94 |
| 2010/0239907 A1 | 9/2010 | Izumi | |
| 2011/0244312 A1 * | 10/2011 | Tani | H01M 2/26 429/163 |
| 2012/0244408 A1 | 9/2012 | Huang et al. | |
| 2013/0083496 A1 | 4/2013 | Franklin et al. | |
| 2013/0100392 A1 | 4/2013 | Fukushima | |
| 2013/0224562 A1 | 8/2013 | Momo | |
| 2013/0252065 A1 | 9/2013 | Ueda | |
| 2013/0273405 A1 | 10/2013 | Takahashi et al. | |
| 2014/0004412 A1 | 1/2014 | Ogino | |
| 2015/0022957 A1 | 1/2015 | Hiroki et al. | |
| 2015/0078588 A1 | 3/2015 | Umehara et al. | |
| 2015/0086860 A1 | 3/2015 | Yokoi et al. | |
| 2015/0111088 A1 | 4/2015 | Hiroki et al. | |
| 2015/0116920 A1 | 4/2015 | Franklin et al. | |
| 2015/0243962 A1 | 8/2015 | Hiroki et al. | |
| 2015/0261254 A1 | 9/2015 | Hiroki et al. | |
| 2015/0333359 A1 | 11/2015 | Takahashi et al. | |
| 2015/0333360 A1 | 11/2015 | Tajima et al. | |
| 2015/0349375 A1 | 12/2015 | Takahashi et al. | |

FOREIGN PATENT DOCUMENTS

| | | |
|---|---|---|
| JP | 2001-052660 A | 2/2001 |
| JP | 2008-262788 A | 10/2008 |
| JP | 2009-181897 A | 8/2009 |
| JP | 2012-004141 A | 1/2012 |
| JP | 2013-093314 A | 5/2013 |
| JP | 2014-029847 A | 2/2014 |
| WO | WO-2000/059063 | 10/2000 |
| WO | WO2012/140709 A | 10/2012 |

\* cited by examiner

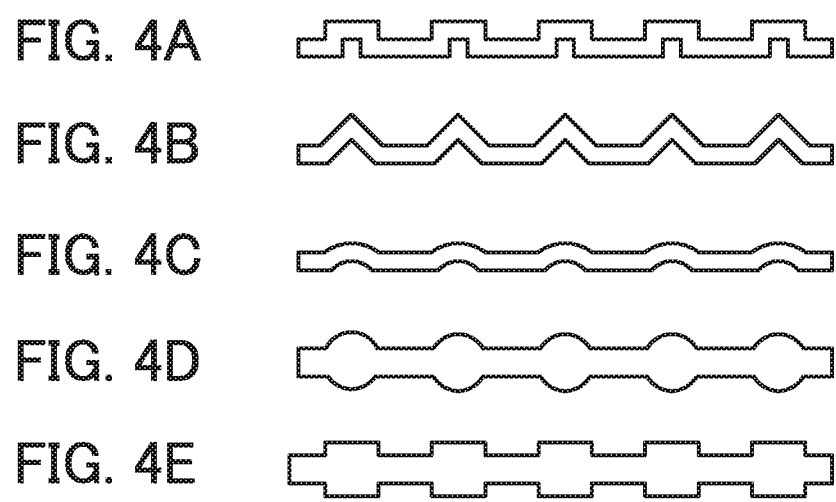

FIG. 5A
FIG. 5C
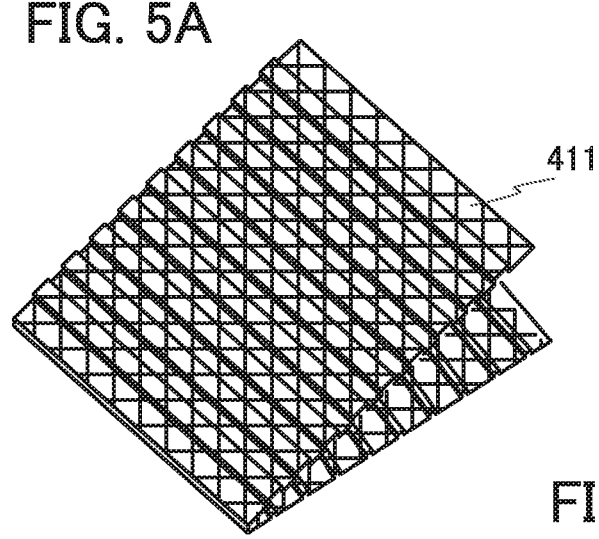
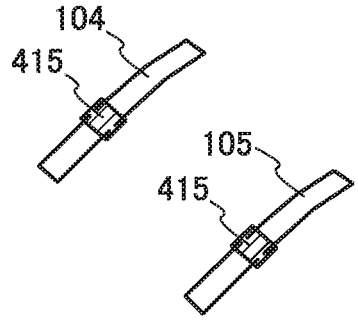
FIG. 5B
FIG. 5D
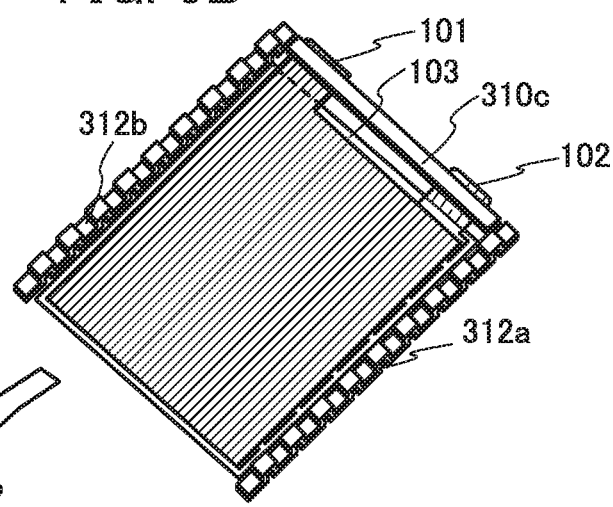
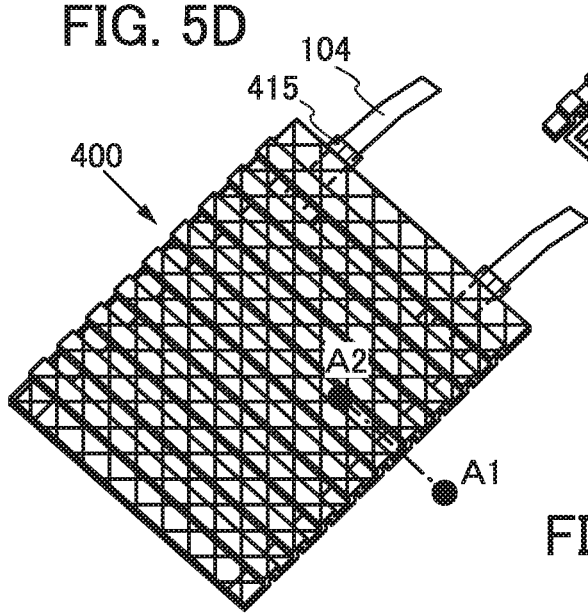
FIG. 5E
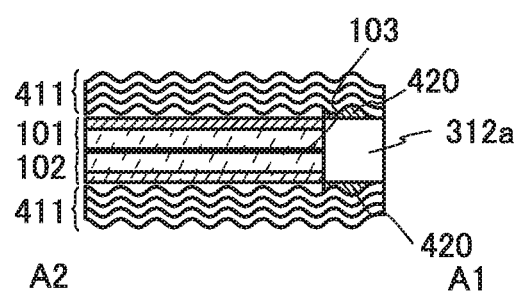

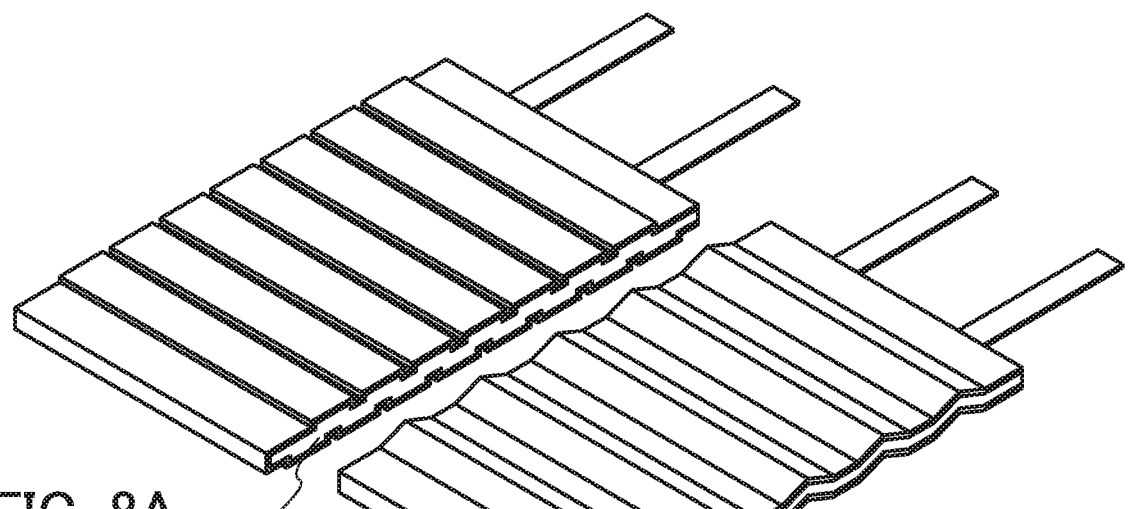
FIG. 8A  603
FIG. 8B  604
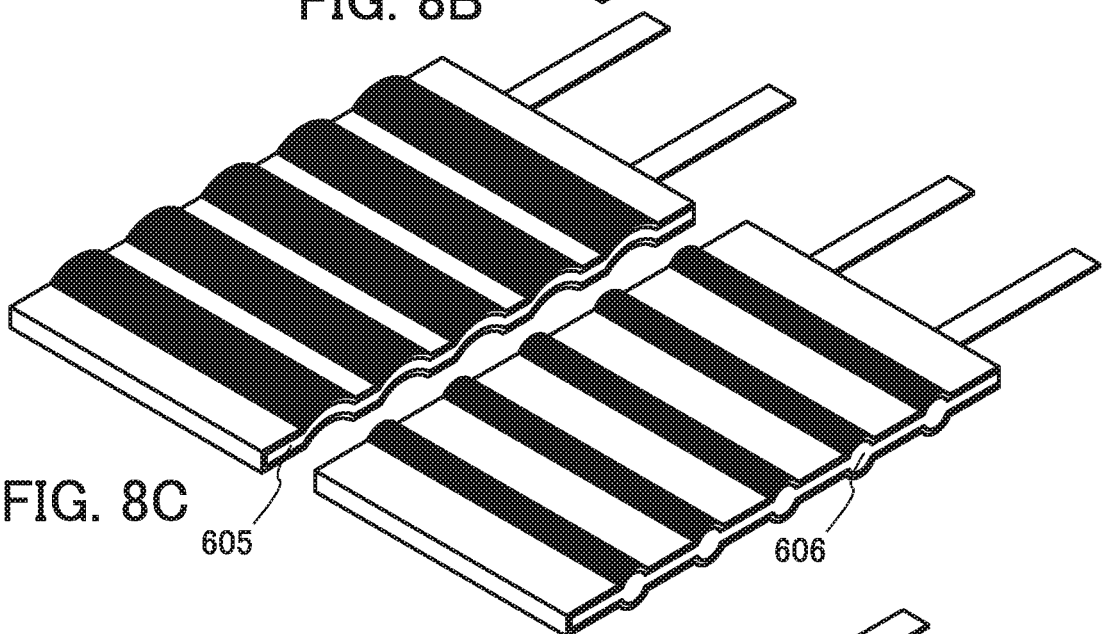
FIG. 8C  605
FIG. 8D  606
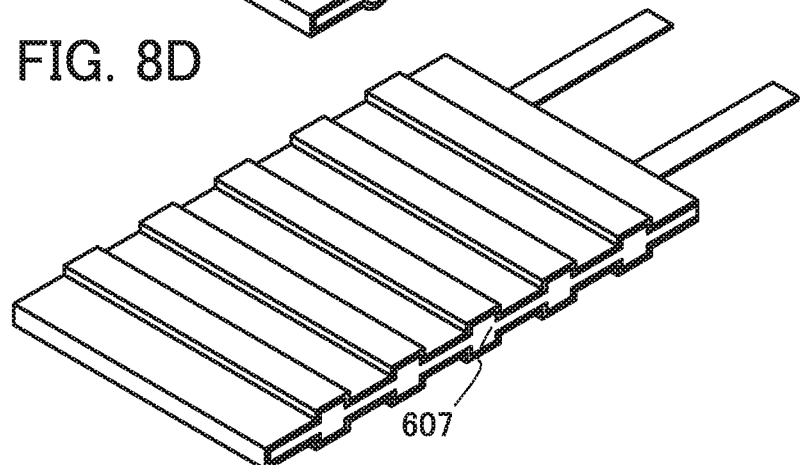
FIG. 8E  607

SECONDARY BATTERY AND ELECTRONIC DEVICE

BACKGROUND OF THE INVENTION

1. Field of the Invention

One embodiment of the present invention relates to an object, a method, or a manufacturing method. One embodiment of the present invention relates to a process, a machine, manufacture, or a composition of matter. One embodiment of the present invention relates to a semiconductor device, a display device, a light-emitting device, a power storage device, a lighting device, an electronic device, or a manufacturing method thereof. In particular, one embodiment of the present invention relates to an electronic device and its operating system.

Note that electronic devices in this specification generally mean devices including secondary batteries, and electro-optical devices including secondary batteries, information terminal devices including secondary batteries, and the like are all electronic devices.

2. Description of the Related Art

Portable electronic devices and wearable electronic devices have been actively developed.

Portable electronic devices and wearable electronic devices operate using secondary batteries as power sources. Portable electronic devices need to withstand the use for a long period and thus preferably incorporate high-capacity secondary batteries. Since high-capacity secondary batteries are large in size, their incorporation into electronic devices increases the weight of the electronic devices. In view of the above, small and thin high-capacity secondary batteries that can be incorporated into portable electronic devices are under development.

A metal can is used as an exterior body of a secondary battery and contains an electrolyte and the like.

A metal can used as an exterior body leads to a problem, that is, an increase in weight of a secondary battery. Furthermore, it is difficult to process a metal can into a thin metal can in order to obtain a thin secondary battery. Thus, a film (also referred to as a laminate film) including a stack of metal foil (e.g., aluminum foil or stainless steel foil) and a resin (heat-seal resin) is used as an exterior body, and this allows fabrication of a secondary battery that is thinner and more lightweight than a secondary battery using a metal can. For example, an example in which metal foil is used for an exterior body is disclosed in Patent Document 1.

REFERENCE

Patent Document

[Patent Document 1] Japanese Published Patent Application No. 2000-173559

SUMMARY OF THE INVENTION

In the case where a film which has lower strength than a metal can is used as an exterior body of a secondary battery, a current collector provided in a region surrounded by the exterior body, an active material layer provided on a surface of the current collector, or the like might be damaged when force is externally applied to the secondary battery. A secondary battery in which a film is used as an external body can have a variety of shapes; for example, the secondary battery is bendable or can have a curved surface by being bent. When the secondary battery is bent, however, stress is concentrated on part of the external body and the part might be easily damaged. For example, in a secondary battery 500 illustrated in FIG. 6A, an electrode group including at least a current collector for a positive electrode, a separator, and a current collector for a negative electrode, or a stack of electrode groups is thicker than a seal region 501. Particularly in that case, stress is concentrated on a slope 502 of an exterior body, which is located along the edge of the electrode group or the stack of electrode groups when the secondary battery is bent as illustrated in FIG. 6B; thus, wrinkles, which can lead to cracks, might be easily generated. Accordingly, bendable secondary batteries resistant to external force that is applied to bend the batteries have been required.

An object of one embodiment of the present invention is to provide a novel power storage device, a novel secondary battery, and the like. Note that the description of these objects does not disturb the existence of other objects. In one embodiment of the present invention, there is no need to achieve all the objects. Other objects will be apparent from and can be derived from the description of the specification, the drawings, the claims, and the like.

In a secondary battery, a cushioning material is provided in a peripheral region sandwiched by an exterior body. Specifically, a cushioning material is provided on the periphery of an electrode group including at least a current collector for a positive electrode, a separator, and a current collector for a negative electrode, and a region where the cushioning material is provided serves as a sealing region. Alternatively, to increase the capacity of the secondary battery, a stack of a plurality of electrode groups is provided in a region surrounded by the exterior body.

The cushioning material is thicker than the current collector.

Examples of the shape of the cushioning material include a columnar shape, a frame shape, a bar-like shape, a rectangular solid shape, and a cylindrical shape. A plurality of cushioning materials may also be provided in a region sandwiched by an exterior body, and the cushioning materials may have different sizes and shapes.

In the case where, in a region sandwiched by an exterior body, a cushioning material is provided in a frame shape along the periphery of an electrode group or a stack of electrode groups, a level difference between a region of the exterior body where the electrode group or the stack of electrode groups is provided and a region of the exterior body where the cushioning material is provided is reduced; thus, in a secondary battery that is bent, the concentration of stress can be alleviated and wrinkles of the exterior body can be suppressed.

A material of the cushioning material is preferably an insulator (e.g., plastic, rubber (natural rubber or synthetic rubber), glass, nonwoven fabric, or paper). In addition, a material of the cushioning material is preferably an elastic material (e.g., synthetic rubber such as silicone rubber, fluorine rubber, chloroprene rubber, nitrile-butadiene rubber, ethylene-propylene rubber, or styrene-butadiene rubber). Specifically, a material having a higher elastic modulus than a separator is used as a material of the cushioning material. The elastic modulus refers to the constant of proportionality between stress and strain in the elastic deformation. The higher the elastic modulus is, the less likely an object is to deform. A porous material including air bubbles (e.g., sheet-like styrofoam or sponge rubber formed using any of the synthetic rubber materials listed above) may also be used as a material of the cushioning material. Also, a gelled material may be used as a material of the cushioning material. Furthermore, the cushioning material may be formed using the same material as the separator so as to have a rolled-sheet shape.

The cushioning material preferably has a higher elastic modulus than the electrode group or the stack of electrode groups so that the electrode group or the stack of electrode groups less easily bends.

A conductive material that has an insulating surface can also be used as a material of the cushioning material. Examples of a material of the cushioning material include carbon fiber whose surface is coated with an organic resin, metal foil (e.g., aluminum foil, copper foil, or stainless steel foil) having a surface over which an inorganic insulating film such as a silicon oxide film is formed, and metal foil whose surface is coated with an organic resin.

In the secondary battery, the cushioning material provided in the region sandwiched by the exterior body allows the electrode group or the stack of electrode groups to be stably positioned. When the secondary battery is bent to have a desired shape, the cushioning material can also be bent so that the secondary battery can have the desired shape, contributing to maintaining of the bent shape of the secondary battery. The cushioning material can also have a restricting function of preventing the secondary battery from bending more than necessary. In addition, the cushioning material can serve as a framework of the secondary battery.

The cushioning material is not necessarily provided so as not to be exposed in the peripheral region sandwiched by the exterior body and may be provided so as to be partly exposed. For example, the cushioning material may be provided so as to be partly exposed such that the side surface of the cushioning material and the side surface of the exterior body are in alignment, the side surface of the cushioning material is on the outer side than the side surface of the exterior body, or the side surface of the cushioning material is on the inner side than the side surface of the exterior body. The cushioning material is provided "on the outer side" when the cushioning material is outside a region surrounded by the exterior body, and the cushioning material is provided "on the inner side" when the cushioning material is inside the region surrounded by the exterior body. In all the above cases, the cushioning material itself serves as part of the exterior body, that is, a sealing material.

Depending on the mode of an electronic device, a secondary battery provided in the electronic device is bent; thus, it is preferred that a cushioning material be bendable. Therefore, a material of the cushioning material is preferably flexible. Furthermore, even when the volume of an electrolytic solution in the secondary battery is reduced because of deterioration over time, the cushioning material helps suppress generation of wrinkles and a change in appearance of the secondary battery that is bent. Moreover, the cushioning material provided in a region sandwiched by an exterior body alleviates the concentration of an impulse that is applied to the secondary battery, protecting the secondary battery from being locally bent and damaged.

By providing a cushioning material in a region sandwiched by an exterior body, a level difference between a region of the exterior body where an electrode group or a stack of electrode groups is provided and a region of the exterior body where the cushioning material is provided is reduced. Thus, the concentration of stress which generates wrinkles of the exterior body can be alleviated in a secondary battery that is bent. As a result, generation of cracks in the external body can be suppressed, leading to a secondary battery more resistant to repeated bending.

A secondary battery of one embodiment of the present invention can change its shape so as to have a radius of curvature of greater than or equal to 10 mm and less than or equal to 30 mm. An exterior body of the secondary battery is formed of one or two films. In the case of a layered secondary battery, the cross-sectional structure of the battery that is bent is surrounded by two curves of the film serving as the exterior body.

The radius of curvature of a surface is described with reference to FIGS. 11A to 11C. In FIG. 11A, on a plane 1701 along which a curved surface 1700 is cut, part of a curve 1702 of the curved surface 1700 is approximate to an arc of a circle, and the radius of the circle is referred to as a radius 1703 of curvature and the center of the circle is referred to as a center 1704 of curvature. FIG. 11B is a top view of the curved surface 1700. FIG. 11C is a cross-sectional view obtained by cutting the curved surface 1700 along the plane 1701. When a curved surface is cut along a plane, the radius of curvature of a curve in a cross section differs depending on the angle between the curved surface and the plane or on the cut position, and the smallest radius of curvature is defined as the radius of curvature of a surface in this specification and the like.

In the case of curving a secondary battery in which a component 1805 including electrodes and an electrolytic solution is sandwiched between two films used as an exterior body, a radius 1802 of curvature of a film 1801 close to a center 1800 of curvature of the secondary battery is smaller than a radius 1804 of curvature of a film 1803 far from the center 1800 of curvature (FIG. 12A). When the secondary battery is bent and has an arc-shaped cross section, compressive stress is applied to a surface of the film close to the center 1800 of curvature and tensile stress is applied to a surface of the film far from the center 1800 of curvature (FIG. 12B). By forming a pattern including projections and depressions on the surfaces of the exterior body, influence of strain can be reduced to an acceptable level even when the compressive stress and the tensile stress are applied. For this reason, the secondary battery can change its shape such that the exterior body close to the center of curvature has a radius of curvature of greater than or equal to 10 mm and less than or equal to 30 mm.

Note that the cross-sectional shape of the secondary battery is not limited to a simple arc shape, and the cross section can be partly arc-shaped; for example, a shape illustrated in FIG. 12C, a wavy shape illustrated in FIG. 12D, and an S shape can be used. When the curved surface of the secondary battery has a shape with a plurality of centers of curvature, the secondary battery can change its shape such that a curved surface with the smallest radius of curvature among radii of curvature with respect to the plurality of centers of curvature (a surface of one of the two films serving as the exterior body on the side close to the center of curvature) has a radius of curvature of greater than or equal to 10 mm and less than or equal to 30 mm.

One embodiment of the present invention can be used for various power storage devices. Examples of the power storage device include a battery, a primary battery, a secondary battery, a lithium-ion secondary battery (including a lithium-ion polymer secondary battery), and a lithium air battery. The examples of the power storage device also include a capacitor. For example, a capacitor such as a lithium-ion capacitor can be fabricated.

The degree of a change in shape of a secondary battery due to external force, that is, a change in part of the internal structure of the secondary battery due to external force, can be controlled by a material or the position of a cushioning material. For example, the cushioning material can suppress sharp bending to such a degree that the internal structure of the secondary battery is not damaged. By providing a cushioning material in a region surrounded by an exterior body, a level difference between a region of the exterior body where an electrode group or a stack of electrode groups is provided and a region of the exterior body where the cushioning material is provided is reduced. Thus, the concentration of stress which generates wrinkles of the exterior body can be alleviated in a secondary battery that is bent. As a result, generation of cracks in the external body can be suppressed, leading to a secondary battery more resistant to repeated bending.

Thus, the cushioning material can protect the internal structure of the secondary battery from being damaged by external bending force. Furthermore, a novel power storage device, a novel secondary battery, and the like can be provided. Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

FIGS. 4A to 4E are schematic views each illustrating a cushioning material of a secondary battery of one embodiment of the present invention.

FIGS. 5A to 5D are schematic external views and FIG. 5E is a cross-sectional view illustrating a secondary battery of one embodiment of the present invention.

FIGS. 8A to 8E are schematic external views each illustrating a secondary battery of one embodiment of the present invention.

DETAILED DESCRIPTION OF THE INVENTION

Hereinafter, embodiments of the present invention will be described in detail with reference to the drawings. However, the present invention is not limited to the description below, and it is easily understood by those skilled in the art that modes and details disclosed herein can be modified in various ways. Furthermore, the present invention is not construed as being limited to the description of the embodiments below.

Note that in each drawing referred to in this specification, the size, the layer thickness, or the region of each component may be exaggerated or the component may be omitted in some cases for clarity of the invention. Therefore, embodiments of the present invention are not limited to such a scale.

Note that ordinal numbers such as "first" and "second" in this specification and the like are used in order to avoid confusion among components and do not denote the priority or the order such as the order of steps or the stacking order. A term without an ordinal number in this specification and the like might be provided with an ordinal number in a claim in order to avoid confusion among components.

Embodiment 1

Figure 1A:
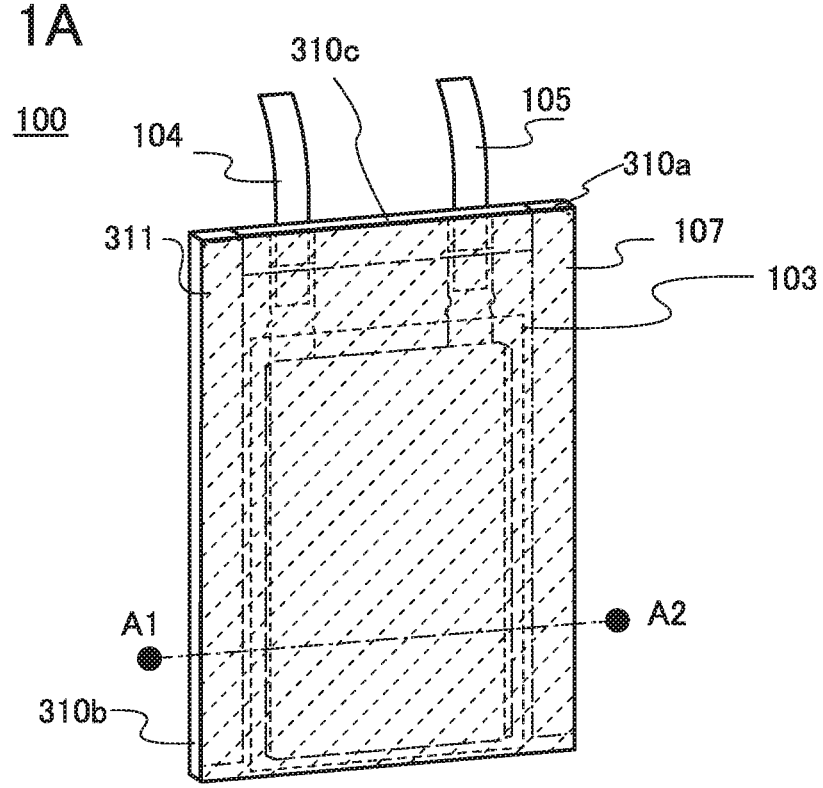
FIG. 1A is a schematic external view and FIGS. 1B to 1D are cross-sectional views each illustrating a secondary battery of one embodiment of the present invention.
Figure 1B:
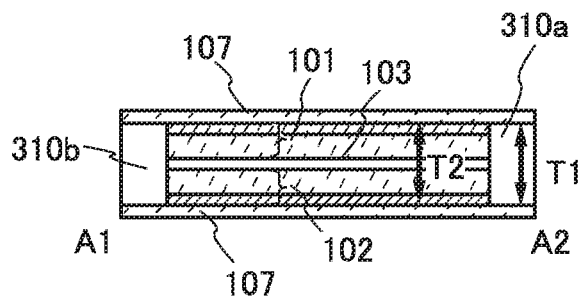
Figure 1C:
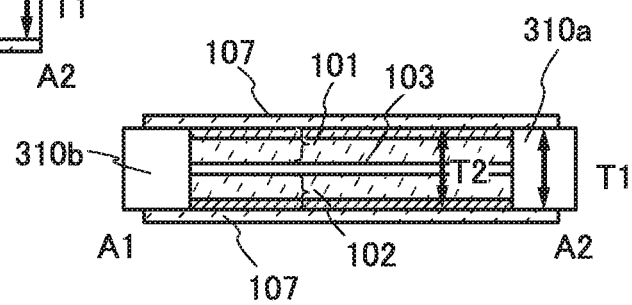
Figure 1D:
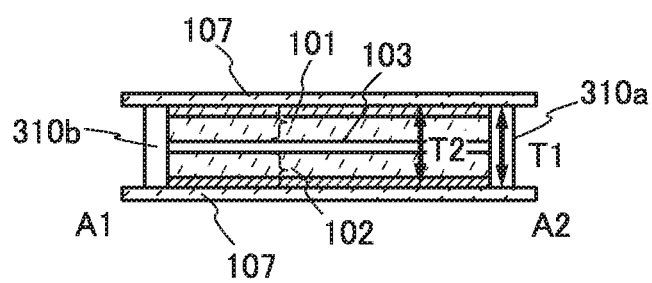

FIG. 1A is an example of a schematic view of a secondary battery. FIGS. 1B to 1D each illustrate an example of the internal structure surrounded by an exterior body of the secondary battery.

A secondary battery 100 of one embodiment of the present invention includes at least a positive electrode 101, a separator 103, a negative electrode 102, a cushioning material, and an electrolytic solution in a region surrounded by an exterior body 107. The secondary battery can have any of a variety of structures, and a film is used for the exterior body 107 in this embodiment.

A film used for the exterior body 107 is a single-layer film selected from a metal film (a film of a metal in the form of foil, such as aluminum, stainless steel, nickel steel, gold, silver, copper, titanium, nichrome, iron, tin, tantalum, niobium, molybdenum, zirconium, or zinc, or an alloy thereof), a plastic film formed of an organic material, a hybrid material film containing an organic material (e.g., organic resin or fiber) and an inorganic material (e.g., ceramic), and a carbon-containing inorganic film (e.g., a carbon film or a graphite film); or a layered film including two or more of these films.

Figure 2A:
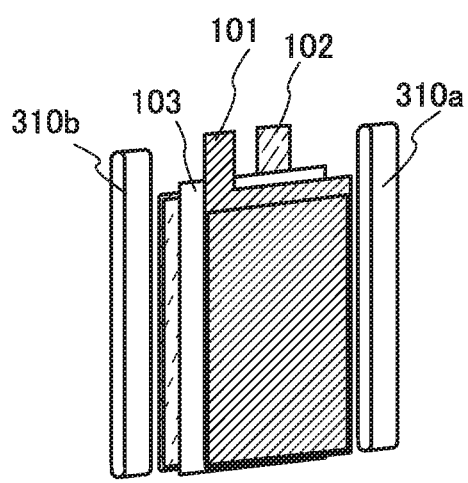
FIGS. 2A to 2D are perspective views each illustrating a structure example of a secondary battery of one embodiment of the present invention.

FIG. 2A illustrates an example in which a first cushioning material 310a and a second cushioning material 310b are used as the cushioning material. In addition to the first cushioning material 310a and the second cushioning material 310b, a third cushioning material 310c may be provided, and FIG. 2B is a schematic view in that case.

In this embodiment, columnar elastic bodies (elastic materials) are used as the first cushioning material 310a, the second cushioning material 310b, and the third cushioning material 310c.

Figure 2B:
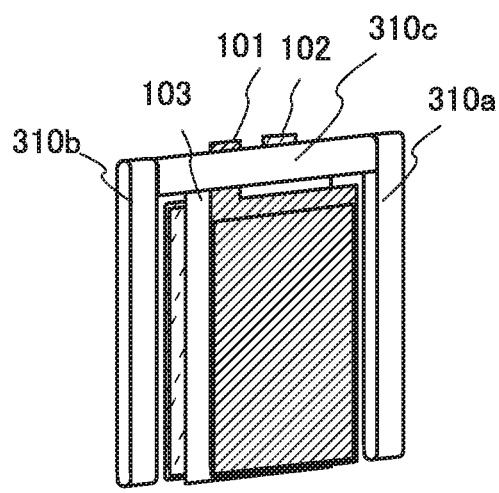

When the third cushioning material is used, three cushioning materials, that is, the first cushioning material 310a, the second cushioning material 310b, and the third cushioning material 310c, are located on the periphery of the electrodes and the like (in a peripheral region) as illustrated in FIG. 2B.

Outer edges of the exterior body 107 are bonded by thermocompression bonding. A surface of a film used for the exterior body 107 is provided with a polypropylene layer, and only a region subjected to thermocompression bonding is a bonding region.

In this embodiment, a bonding region 311 is a region where the first cushioning material 310a, the second cushioning material 310b, and the third cushioning material 310c are located, and the first cushioning material 310a may be exposed at the side surface of the secondary battery 100. In addition, the second cushioning material 310b and the third cushioning material 310c may be exposed at the side surfaces of the secondary battery 100. The first cushioning material 310a, the second cushioning material 310b, and the third cushioning material 310c also serve as sealing materials.

As a material for the first cushioning material 310a, the second cushioning material 310b, and the third cushioning material 310c, a material having a higher elastic modulus than the separator is preferably used. For example, rubber (e.g., natural rubber or synthetic rubber) is used. Note that a material that is less likely to chemically react by contact with an electrolytic solution is preferably selected. In this embodiment, silicone rubber, which is less likely to chemically react by contact with an electrolytic solution, is used. Furthermore, a region of the material used for the first cushioning material 310a, the second cushioning material 310b, and the third cushioning material 310c, which is in contact with an electrolytic solution, is preferably coated with a material with a high solvent resistance to an electrolytic solution and subjected to surface treatment.

As a material for the first cushioning material 310a, the second cushioning material 310b, and the third cushioning material 310c, a material that can be bonded by thermocompression bonding is preferably used.

The first cushioning material 310a, the second cushioning material 310b, and the third cushioning material 310c can suppress generation of wrinkles of the film serving as the exterior body in the outer edge of the secondary battery 100 even when the secondary battery 100 is bent.

The third cushioning material 310c can be provided on the lead side. The first cushioning material 310a, the second cushioning material 310b, and the third cushioning material 310c can hold the gap in a region surrounded by the external body; thus, a cushioning material is not necessarily provided on the side opposite to the lead side. At least one side is not provided with the cushioning material, so that the size of the external body can be small. Furthermore, a space can be formed so that the electrode group is not in contact with the external body, when the battery is bent and the electrode group slides in the region surrounded by the external body. The external body is bent on the side opposite to the lead side, and other three sides are sealed.

When a stack of a plurality of electrode groups each including the positive electrode 101, the separator 103, and the negative electrode 102 is provided in the region surrounded by the exterior body to increase the capacity of the secondary battery 100, the total thickness of that region is increased and is greatly different from the thickness of the peripheral region. This generates a level difference on the film serving as the external body. A large level difference on the external body causes stress to concentrate on a certain region when the secondary battery is bent, which can generate wrinkles and the like of the external body. The first cushioning material 310a, the second cushioning material 310b, and the third cushioning material 310c are preferably provided to reduce the level difference.

The length of the first cushioning material 310a and the length of the second cushioning material 310b may also be increased to provide a space so that the current collector and the like can easily slide when the secondary battery 100 is bent.

The example has been described, in which three elastic bodies, the first cushioning material 310a, the second cushioning material 310b, and the third cushioning material 310c, are used; however, one embodiment of the present invention is not particularly limited thereto and one U-shaped elastic material may be used as a cushioning material.

Figure 2C:
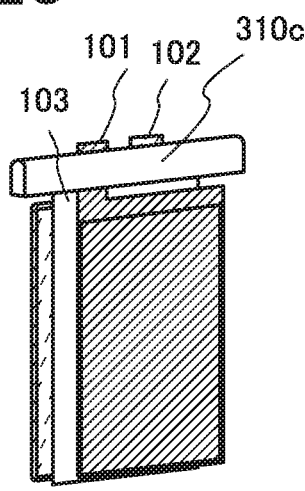
Figure 2D:
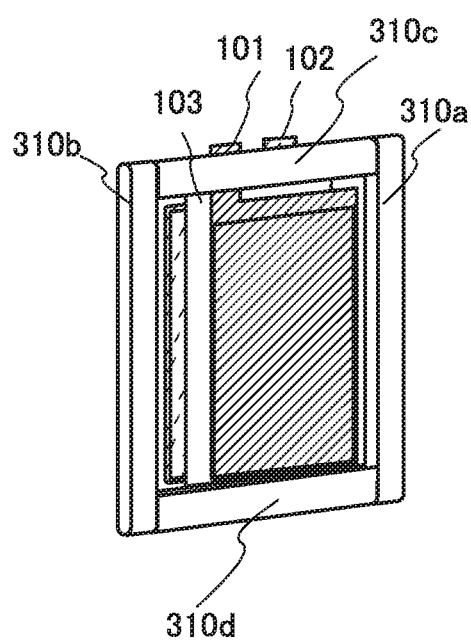

Only the third cushioning material 310c may be provided on the lead side as illustrated in FIG. 2C. As illustrated in FIG. 2D, in addition to the third cushioning material 310c on the lead side, a fourth cushioning material 310d may be provided on the side opposite to the lead side. When the fourth cushioning material 310d is provided, a space may be provided as described above so that the current collector and the like can easily slide.

The columnar elastic body may have an uneven surface. FIGS. 4A to 4E illustrate other examples the columnar elastic body, which are different from the above examples. The columnar elastic body may have a shape whose cross section has a rectangular wave shape (FIG. 4A), a triangular shape (FIG. 4B), a half-arc shape (FIG. 4C), a shape in which a plurality of circles are continuously connected in the lateral direction with a band (FIG. 4D), or a shape in which a plurality of quadrangles are continuously connected in the lateral direction with a band (FIG. 4E).

Figure 7:
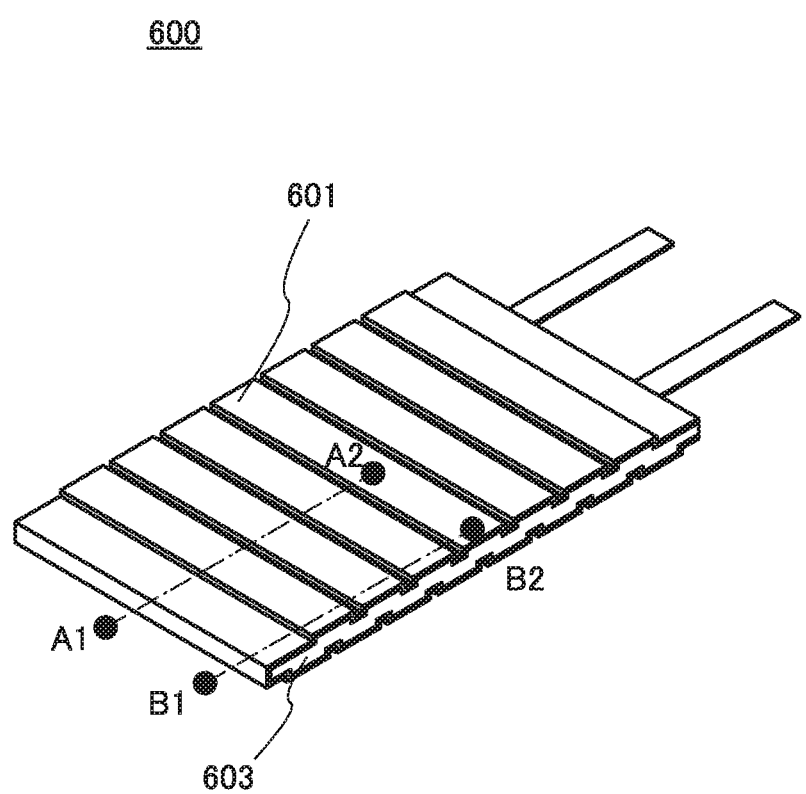
FIG. 7 is a schematic external view illustrating a secondary battery of one embodiment of the present invention.

FIG. 7 schematically illustrates, as an example in which a columnar elastic body having the above uneven surface is used as a cushioning material, a secondary battery 600 including a cushioning material 603 whose cross section has a rectangular wave shape. FIGS. 8A to 8E are schematic external views illustrating examples in which cushioning materials having the above uneven surfaces illustrated in FIGS. 4A to 4E are used in secondary batteries. Specifically, FIG. 8A illustrates a secondary battery including the cushioning material 603 whose cross section has a rectangular wave shape. FIG. 8B illustrates a secondary battery including a cushioning material 604 whose cross section has a triangular shape. FIG. 8C illustrates a secondary battery including a cushioning material 605 whose cross section has a half-arc shape. FIG. 8D illustrates a secondary battery including a cushioning material 606 whose cross section has a shape in which a plurality of circles are continuously connected in the lateral direction with a band. FIG. 8E illustrates a secondary battery including a cushioning material 607 whose cross section has a shape in which a plurality of quadrangles are continuously connected in the lateral direction with a band.

The cross-sectional shape of the first and second cushioning materials 310a and 310b may be different from that of the third and fourth cushioning materials 310c and 310d. For example, in a secondary battery illustrated in FIGS. 5A to 5E, the cross sections of the first and second cushioning materials 312a and 312b each have a rectangular wave shape, whereas the surface of the third cushioning material 310c is flat.

Figure 9A:
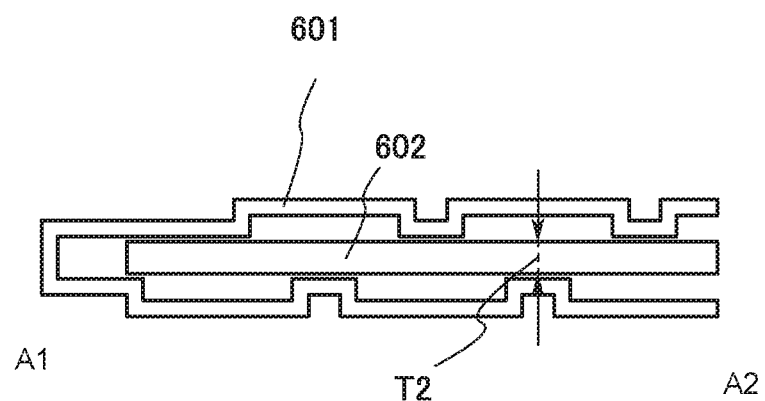
FIGS. 9A and 9B are schematic cross-sectional views illustrating a secondary battery of one embodiment of the present invention.
Figure 9B:
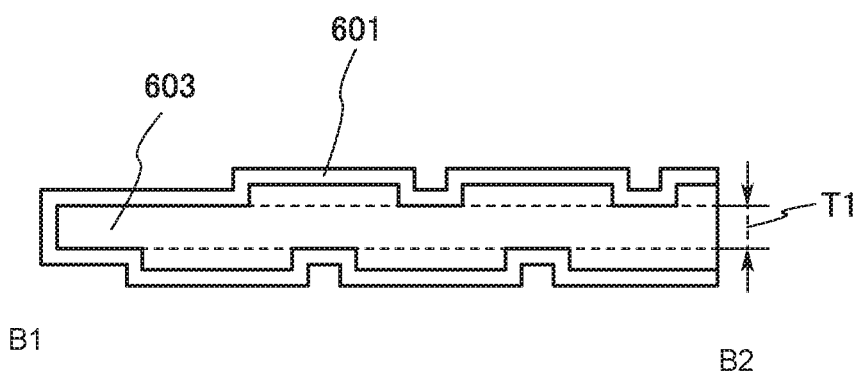

In the secondary battery illustrated in FIG. 7, the cross section of an external body 601 also has a rectangular wave shape which fits with the cross section of the cushioning material 603. FIG. 9A schematically illustrates the cross section along the line A1-A2 in FIG. 7, and FIG. 9B schematically illustrates the cross section along the line B1-B2 in FIG. 7. As illustrated in FIG. 9A, a protruding portion of the back surface (a surface on the side partly in contact with an electrode group 602 or a stack 602 of electrode groups) of the external body 601 and the electrode group 602 or the stack 602 of electrode groups are located partly in contact with each other. Note that the secondary battery in this specification is bendable.

The cushioning material is thicker than the current collector. FIG. 1B illustrates the secondary battery including a columnar cushioning material. FIG. 1B is a schematic cross-sectional view along the line A1-A2 of the secondary battery 100 illustrated in FIG. 1A. $T_1$ represents the thickness of the first and second cushioning materials 310a and 310b, and $T_2$ represents the thickness of the electrode group or the stack of electrode groups. $T_1$ is greater than or equal to 80% and less than or equal to 120%, preferably greater than or equal to 90% and less than or equal to 110% of $T_2$, and more preferably, $T_1$ is equal to $T_2$. Accordingly, there is no level difference also at the boundary between the cushioning material and the electrode group or the stack of electrode groups, so that there is no level difference between a seal region and a region of the external body where the electrode group or the stack of electrode groups is provided, and the surface of the secondary battery is flat.

In the example illustrated in FIG. 1B, the side surface of the external body 107 and the side surfaces of the first and second cushioning materials 310a and 310b, which are, in this case, on the side opposite to the side where the electrode group or the stack of electrode groups is provided, are in alignment. However, one embodiment of the present invention is not limited thereto. As illustrated in FIG. 1C, on the side opposite to the side where the electrode group or the stack of electrode groups is provided, the side surfaces of the first and second cushioning materials 310a and 310b may be on the outer side than the side surface of the external body 107. Alternatively, as illustrated in FIG. 1D, the side surfaces of the first and second cushioning materials 310a and 310b may be on the inner side than the side surface of the external body 107. The arrangement of the first and second cushioning materials 310a and 310b and the external body 107 can be determined as appropriate, depending on the case where the secondary battery described in this specification is used.

In the case of the cushioning material having a flat columnar shape as described above, the thicknesses of the cushioning material and the electrode group are preferably set equal to each other. In the case of the cushioning material having an uneven surface as illustrated in FIG. 7, the distance between surfaces which are obtained by connecting depressed portions of the cushioning material 603 is represented by $T_1$ as illustrated in FIG. 9B, and the thickness of the electrode group or the stack of electrode groups is represented by $T_2$ as illustrated in FIG. 9A; $T_1$ is preferably greater than or equal to 80% and less than or equal to 120%, more preferably greater than or equal to 90% and less than or equal to 110% of $T_2$. The thicknesses of the cushioning material and the electrode group are preferably set close to each other as described above, thereby suppressing generation of wrinkles of the exterior body 601 when the secondary battery 600 is bent.

In the secondary battery, the cushioning material provided in the region sandwiched by the exterior body allows the electrode group or the stack of electrode groups to be stably positioned. When the secondary battery is bent to have a desired shape, the cushioning material can also be bent so that the secondary battery can have the desired shape, contributing to maintaining of the bent shape of the secondary battery. The cushioning material can also have a restricting function of preventing the secondary battery from bending more than necessary. In addition, the cushioning material can serve as a framework of the secondary battery. By providing the cushioning material in the region sandwiched by the exterior body of the secondary battery, influence of strain can be reduced to an acceptable level even when force is externally applied to the secondary battery. Accordingly, a highly reliable secondary battery can be provided.

The positive electrode 101 includes a current collector (e.g., aluminum) with one surface or opposite surfaces each provided with a positive electrode active material layer and the like. The negative electrode 102 includes a current collector (e.g., copper) with one surface or opposite surfaces each provided with a negative electrode active material layer and the like. The positive electrode 101 is electrically connected to a positive electrode lead 104. The negative electrode 102 is electrically connected to a negative electrode lead 105. Each of the positive electrode lead 104 and the negative electrode lead 105 is also referred to as a lead electrode or a lead terminal. The positive electrode lead 104 and the negative electrode lead 105 are partly positioned outside the exterior body. The secondary battery 100 is charged and discharged through the positive electrode lead 104 and the negative electrode lead 105.

The positive electrode current collector can be formed using a material that has high conductivity and does not dissolve at the potential of the positive electrode, such as a metal typified by stainless steel, gold, platinum, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, and nickel. The positive electrode current collector can have a foil shape, a plate (sheet) shape, a net shape, a punching-metal shape, an expanded-metal shape, or the like as appropriate. The positive electrode current collector preferably has a thickness of greater than or equal to 5 μm and less than or equal to 30 μm. The surface of the positive electrode current collector may be provided with an undercoat layer using graphite or the like.

The negative electrode current collector can be formed using a material that has high conductivity and is not alloyed with a carrier ion of lithium or the like, such as a metal, e.g., stainless steel, gold, platinum, iron, copper, or titanium, or an alloy thereof. Alternatively, an aluminum alloy to which an element which improves heat resistance, such as silicon, titanium, neodymium, scandium, or molybdenum, is added can be used. The negative electrode current collector can have a foil shape, a plate (sheet) shape, a net shape, a punching-metal shape, an expanded-metal shape, or the like as appropriate. The negative electrode current collector preferably has a thickness of greater than or equal to 5 μm and less than or equal to 30 μm. The surface of the negative electrode current collector may be provided with an undercoat layer using graphite or the like.

Next, a current flow in charging the secondary battery is described with reference to FIG. 3B. When a secondary battery using lithium is regarded as a closed circuit, lithium ions transfer and a current flows in the same direction. Note that in the secondary battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, whether it is at the time of charging or discharging is noted and whether it corresponds to a positive electrode or a negative electrode is also noted.

Figure 3A:
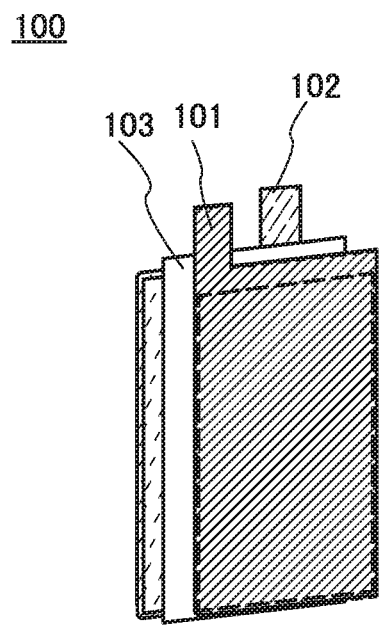
FIG. 3A is a perspective view and FIG. 3B is a schematic cross-sectional view illustrating a structure example of a secondary battery of one embodiment of the present invention.
Figure 3B:
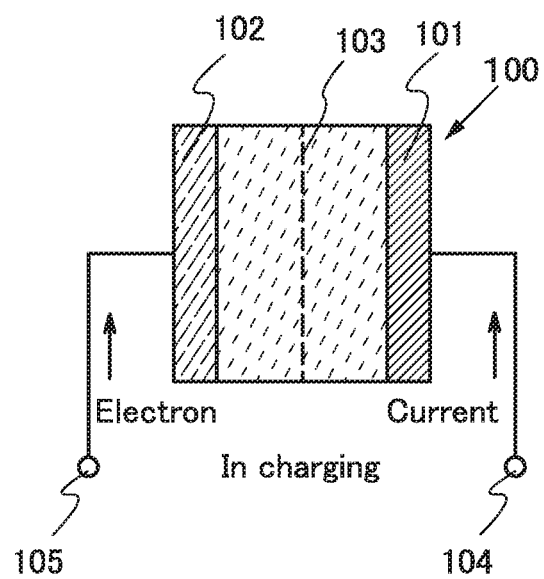
Figure 6A:
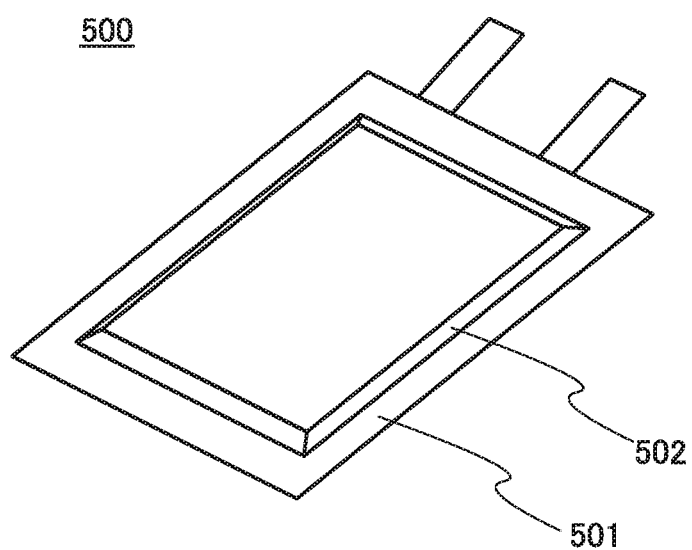
FIGS. 6A and 6B are perspective external views illustrating a conventional secondary battery.
Figure 6B:
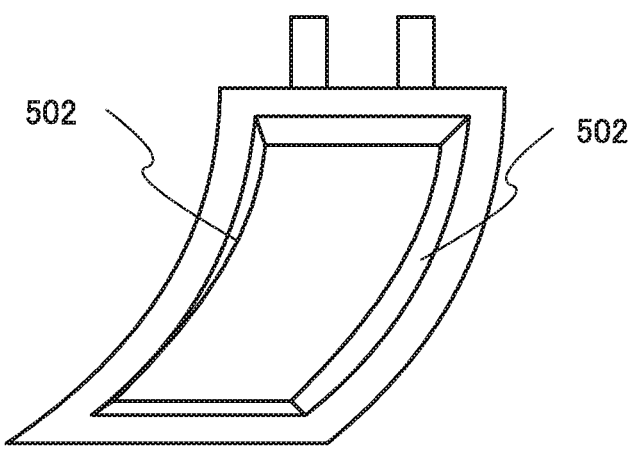

Two terminals illustrated in FIG. 3B are connected to a charger, and the secondary battery 100 is charged. As the charge of the secondary battery 100 proceeds, a potential difference between electrodes increases. The positive direction in FIG. 3B is the direction in which a current flows from a terminal (the positive electrode lead 104) outside the secondary battery 100 to the positive electrode 101, and flows from the positive electrode 101 to the negative electrode 102 in the secondary battery 100, and from the negative electrode 102 to the other terminal (the negative electrode lead 105) outside the secondary battery 100. In other words, a current flows in the direction of a flow of a charging current.

In this embodiment, the example in which the electrode group including at least one pair of the positive electrode 101 and the negative electrode 102 is provided in the region surrounded by the exterior body 107 is described for simplicity. However, the stack of electrode groups may be provided in the region surrounded by the exterior body 107 in order to increase the capacity of the secondary battery.

In the region surrounded by the exterior body 107, the positive electrode 101, the separator 103, and the negative electrode 102 are provided as illustrated in FIG. 3A.

The number of each of these components may also be two or more. Note that the exterior body 107, the positive electrode lead 104, and the negative electrode lead 105 are not illustrated in FIG. 3A for simplicity.

As a material for the separator 103, a porous insulator such as cellulose, polypropylene (PP), polyethylene (PE), polybutene, nylon, polyester, polysulfone, polyacrylonitrile, polyvinylidene fluoride, or tetrafluoroethylene can be used. Alternatively, nonwoven fabric of a glass fiber or the like, or a diaphragm in which a glass fiber and a polymer fiber are mixed may be used.

In the secondary battery of this embodiment, for example, the separator 103 has a thickness of approximately 15 μm to 30 μm, the current collector of the positive electrode 101 has a thickness of approximately 10 μm to 40 μm, the positive electrode active material layer has a thickness of approximately 50 μm, to 100 μm, the negative electrode active material layer has a thickness of approximately 50 μm to 100 μm, and the current collector of the negative electrode 102 has a thickness of approximately 5 μm to 40 μm.

Although a sheet-like separator is used as the separator 103 in FIG. 3A, a bag-like separator may also be used. Furthermore, one separator may be bent and provided in the region surrounded by the exterior body 107 such that the positive electrode (or the negative electrode) is located between facing surfaces of the bent separator.

Examples of the positive electrode active material used for the positive electrode active material layer of the secondary battery 100 include a composite oxide with an olivine crystal structure, a composite oxide with a layered rock-salt crystal structure, and a composite oxide with a spinel crystal structure. As the positive electrode active material, a compound such as $LiFeO_2$, $LiCoO_2$, $LiNiO_2$, $LiMn_2O_4$, $V_2O_5$, $Cr_2O_5$, or $MnO_2$ can be used.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material include lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1). $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a complex material such as $Li_{(2-j)}MSiO_4$ (general formula) (M is one or more of Fe(II), Mn(II), Co(II), and Ni(II); 0≤j≤2) can be used. Typical examples of the general formula $Li_{(2-j)}MSiO_4$ which can be used as a material include lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_mMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W. As, or Si) can be used as the positive electrode active material. Examples of the nasicon compound include $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaFeF_3$ or $FeF_3$, a metal chalcogenide (a sulfide, a selenide, or a telluride) such as $TiS_2$ or $MoS_2$, an oxide with an inverse spinel crystal structure such as $LiMVO_4$, a vanadium oxide (e.g., $V_2O_5$, $V_6O_{13}$, or $LiV_3O_8$), a manganese oxide, an organic sulfur, or the like can be used as the positive electrode active material.

A lithium-manganese composite oxide that is represented by a composition formula $Li_xMn_yM_zO_w$ can also be used as the positive electrode active material. The element M is preferably silicon, phosphorus, or a metal element other than lithium and manganese, and is more preferably nickel. In addition, $x/(v+z)$ is preferably larger than or equal to 0 and smaller than 2, z is preferably larger than 0, and $(y+z)/w$ is preferably larger than or equal to 0.26 and smaller than 0.5. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like. The lithium-manganese composite oxide preferably has a layered rock-salt crystal structure. The lithium-manganese composite oxide may also have a layered rock-salt crystal structure and a spinel crystal structure. The average particle diameter of the lithium-manganese composite oxides is preferably greater than or equal to 5 nm and less than or equal to 50 μm, for example.

In the case where carrier ions are alkali metal ions other than lithium ions, or alkaline-earth metal ions, a material containing an alkali metal (e.g., sodium or potassium) or an alkaline-earth metal (e.g., calcium, strontium, barium, beryllium, or magnesium) instead of lithium may be used as the positive electrode active material.

As the separator 103, an insulator can be used. Examples of the insulator include cellulose (paper), polypropylene with pores, and polyethylene with pores.

As an electrolyte in the electrolytic solution, a material which contains lithium ions serving as carrier ions and in which lithium ions can transfer is used. Typical examples of the electrolyte include lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone or two or more of them may be used in an appropriate combination and in an appropriate ratio.

As a solvent of the electrolytic solution, a material in which carrier ions can transfer is used. As the solvent of the electrolytic solution, an aprotic organic solvent is preferably used. Typical examples of the aprotic organic solvent include ethylene carbonate (EC), propylene carbonate, dimethyl carbonate, diethyl carbonate (DEC), γ-butyrolactone, acetonitrile, dimethoxyethane, and tetrahydrofuran, and one or more of these materials can be used. When a gelled high-molecular material is used as the solvent of the electrolytic solution, safety against liquid leakage and the like is improved. Furthermore, the secondary battery can be thinner and more lightweight. Typical examples of the gelled high-molecular material include a silicone gel, an acrylic gel, an acrylonitrile gel, a polyethylene oxide gel, a polypropylene oxide gel, and a fluorine-based polymer gel. The use of one or more of ionic liquids (room temperature molten salts) which have features of non-flammability and non-volatility as a solvent of the electrolytic solution can prevent the secondary battery from exploding or catching fire even when the secondary battery internally shorts out or the internal temperature increases owing to overcharging or the like. An ionic liquid is a salt in the fluid state and has high ion mobility (conductivity). The ionic liquid includes a cation and an anion. Examples of the ionic liquid include an ionic liquid containing an ethylmethylimidazolium (EMI) cation and an ionic liquid containing an N-methyl-N-propylpiperidinium ($PP_{13}$) cation.

Instead of the electrolytic solution, a solid electrolyte including an inorganic material such as a sulfide-based inorganic material or an oxide-based inorganic material, or a solid electrolyte including a high-molecular material such as a polyethylene oxide (PEO)-based high-molecular material may be used. In the case of using the solid electrolyte, a separator or a spacer is not necessary. Furthermore, the battery can be entirely solidified; therefore, there is no possibility of liquid leakage and thus the safety of the battery is dramatically increased.

A material with which lithium can be dissolved and precipitated or a material into and from which lithium ions can be inserted and extracted can be used for the negative electrode active material of the negative electrode active material layer of the secondary battery 100; for example, a lithium metal, a carbon-based material, an alloy-based material, or the like can be used.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, and carbon black.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

For the negative electrode active material, an alloy-based material which enables charge-discharge reaction by an alloying reaction and a dealloying reaction with lithium can be used. In the case where carrier ions are lithium ions, examples of the alloy-based material include a material containing at least one of Al, Si, Ge, Sn, Pb, Sb, Bi, Ag, Au, Zn, Cd, In, Ga, and the like. Such elements have higher capacity than carbon. In particular, silicon has a significantly high theoretical capacity of 4200 mAh/g. For this reason, silicon is preferably used for the negative electrode active material. Examples of the material using such an element include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn. Note that SiO refers to the powder of a silicon oxide including a silicon-rich portion and can also be referred to as $SiO_y$ ($2>y>0$). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, or manganese). In other words, SiO refers to a colored material containing two or more of single crystal silicon, amorphous silicon, polycrystal silicon, $Si_2O_3$, $Si_3O_4$, $Si_2O$, and $SiO_2$. Thus, SiO can be distinguished from $SiO_x$ (x is 2 or more), which is clear and colorless or white. Note that in the case where a secondary battery is fabricated using SiO as a material thereof and the SiO is oxidized because of repeated charge and discharge cycles, SiO is changed into $SiO_2$ in some cases.

Alternatively, as the negative electrode active material, an oxide such as titanium dioxide ($TiO_2$), lithium titanium oxide ($Li_4Ti_5Oi_2$), a lithium-graphite intercalation compound ($Li_xC_6$), niobium pentoxide ($Nb_2O_5$), tungsten oxide ($WO_2$), or molybdenum oxide ($MoO_2$) can be used.

Still alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of its high charge and discharge capacity (900 mAh/g and 1890 mAh/cm$^3$).

The nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as the positive electrode active material, the nitride containing lithium and a transition metal can be used for the negative electrode active material by extracting the lithium ions contained in the positive electrode active material in advance.

Alternatively, a material which causes a conversion reaction can be used as the negative electrode active material. For example, a transition metal oxide with which an alloying reaction with lithium is not caused, such as cobalt oxide (CoO), nickel oxide (NiO), or iron oxide (FeO), may be used as the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as the positive electrode active material because of its high potential.

The negative electrode active material layer may further include a binder for increasing adhesion of active materials, a conductive additive for increasing the conductivity of the negative electrode active material layer, and the like in addition to the above negative electrode active materials.

The cushioning material is not necessarily provided so as not to be exposed in the peripheral region sandwiched by the exterior body and may be provided so as to be partly exposed. In bonding outer edges of the exterior body 107 by thermocompression bonding, thermocompression bonding may be performed for sealing with a bonding region and part of the sheet-like cushioning material overlapping with each other. In that case, the sheet-like cushioning material is fixed in a portion in contact with the bonding region.

Although the example of a small battery used in a portable information terminal or the like is described in this embodiment, one embodiment of the present invention is not particularly limited thereto. Application to a large battery provided in a vehicle or the like is also possible.

In Embodiment 1, one embodiment of the present invention has been described. Other embodiments of the present invention are described in Embodiments 2 to 6. Note that one embodiment of the present invention is not limited to the above examples. That is, since various embodiments of the present invention are disclosed in Embodiment 1 and Embodiments 2 to 6, one embodiment of the present invention is not limited to a specific embodiment. The example in which one embodiment of the present invention is applied to a secondary battery is described; however, one embodiment of the present invention is not limited thereto. Depending on circumstances or conditions, one embodiment of the present invention can be used for a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, an air battery, a zinc air battery, a lithium air battery, a primary battery, a capacitor, an electric double layer capacitor, an ultracapacitor, a supercapacitor, and a lithium ion capacitor. The example in which the secondary battery is changed in its shape or bent is described as one embodiment of the present invention; however, one embodiment of the present invention is not limited thereto. Depending on circumstances or conditions, the secondary battery of one embodiment of the present invention may have any of a variety of shapes. Depending on circumstances or conditions, for example, the secondary battery of one embodiment of the present invention may have a flat shape. Alternatively, for example, depending on circumstances or conditions, the secondary battery of one embodiment of the present invention is not necessarily changed in its shape.

Embodiment 2

In this embodiment, unevenness is formed on a film serving as an exterior body by pressing, e.g., embossing, first, second, and third cushioning materials 312a. 312b, and 310c are provided in a region sandwiched by the exterior body, an elastic body (elastic material) whose cross section has a rectangular wave shape is used for each of the first and second cushioning materials 312a and 312b, and a columnar elastic body is used for the third cushioning material 310c.

In this embodiment, an example of fabricating a lithium-ion secondary battery with the use of a film whose surface is embossed with a pattern is described with reference to FIGS. 5A to 5E. Note that in FIGS. 5A to 5E, the same reference numerals are used for the same parts as those in FIGS. 1A to 1D, and detailed description of the parts is omitted for simplicity.

First, a sheet formed of a flexible material is prepared. As the sheet, a stack. i.e., a metal film provided with an adhesive layer (also referred to as a heat-seal layer) or sandwiched between adhesive layers, is used. As the adhesive layer, a heat-seal resin film containing, e.g., polypropylene or polyethylene, is used. In this embodiment, a metal sheet, specifically, aluminum foil whose top surface is provided with a nylon resin and whose bottom surface is provided with a stack including an acid-proof polypropylene film and a polypropylene film, is used for the sheet. This sheet is cut to obtain a film.

Then, the film is embossed to form unevenness on its surface so that the pattern can be visually recognized. Although an example in which the sheet is cut and then embossing is performed is described here, the order is not particularly limited; embossing may be performed before cutting the sheet and then the sheet may be cut. Alternatively, the sheet may be cut after thermocompression bonding is performed with the sheet bent.

Note that embossing is a kind of pressing and refers to processing for forming unevenness corresponding to unevenness of an embossing roll on a surface of a film by bringing the embossing roll whose surface has unevenness into contact with the film with pressure. The embossing roll is a roll whose surface is patterned.

The embossing roll is not necessarily used, and an embossing plate may be used. Furthermore, embossing is not necessarily employed, and any method that allows formation of a relief on part of the film may be employed.

In this embodiment, opposite surfaces of a film 411 are provided with unevenness to have patterns, and the film 411 is folded at the center so that two end portions overlap with each other, and is sealed on three sides with an adhesive layer.

Since a cushioning material is provided in the seal region, the seal region is not necessarily embossed but may also be embossed when there is no problem in adhesion. FIGS. 5A to 5E illustrate an example in which a region where an electrode group or a stack of electrode groups is provided is embossed.

The film 411 is folded in half, so that the state illustrated in FIG. 5A is obtained.

As illustrated in FIG. 5B, the electrode group including the positive electrode 101, the separator 103, and the negative electrode 102 and the first, second, and third cushioning materials 312a, 312b, and 310c, which are included in the secondary battery, are prepared. For the current collectors used for the positive electrode 101 and the negative electrode 102, Embodiment 1 can be referred to. Note that the example in which one electrode group including the positive electrode 101, the separator 103, and the negative electrode 102 is provided in the region surrounded by the exterior body is illustrated here for simplicity; however, to increase the capacity of the secondary battery, a plurality of electrode groups may be provided in the region surrounded by the exterior body.

Then, two lead electrodes provided with sealing layers 415 illustrated in FIG. 5C are prepared. The lead electrodes are each also referred to as a lead terminal and provided in order to lead a positive electrode or a negative electrode of a secondary battery to the outside of a region surrounded by an exterior film. Aluminum and nickel-plated copper are used as the positive electrode lead 104 and the negative electrode lead 105, respectively.

The positive electrode lead 104 is electrically connected to a protruding portion of the positive electrode 101 by ultrasonic welding or the like. The negative electrode lead 105 is electrically connected to a protruding portion of the negative electrode 102 by ultrasonic welding or the like.

The cushioning materials are provided along the periphery of the electrode group including at least the positive electrode 101, the separator 103, and the negative electrode 102. One of the cushioning materials is not provided temporarily because an electrolytic solution is introduced later. Alternatively, one of the cushioning materials is provided in a position that is different from a final position. For example, it is also possible to employ a method in which the second and third cushioning materials 312b and 310c are first provided, an electrolytic solution is then introduced, and the first cushioning material 312a is provided. Alternatively, a method may be employed, in which the first cushioning material 312a is temporarily provided in a position that is different from a final position, an electrolytic solution is then introduced, and the first cushioning material 312a is provided in the final position.

Then, two sides of the film 411 are sealed by thermocompression bonding, and one side is left open for introduction of an electrolytic solution. In thermocompression bonding, the sealing layers 415 provided over the lead electrodes are also melted, thereby fixing the lead electrodes and the film 411 to each other. After that, in a reduced-pressure atmosphere or an inert atmosphere, a desired amount of the electrolytic solution is introduced to a region surrounded by the film 411 in the form of a bag. Lastly, the side of the film which has not been subjected to thermocompression bonding and is left open is sealed by thermocompression bonding.

In this manner, a secondary battery 400 illustrated in FIG. 5D can be fabricated. FIG. 5E is a schematic cross-sectional view of the secondary battery 400 along the line A1-A2 in FIG. 5D.

The surface of the cushioning material may be provided with a fusing layer so that the adhesion between the cushioning material and the external body can be increased. For example, as illustrated in FIG. 5E, a fusing layer 420 may be provided between the first cushioning material 312a and the external body.

In the secondary battery 400, the surface of the film 411 serving as the exterior body has a pattern including unevenness. An edge region is a thermocompression-bonding region. The surface of the thermocompression-bonding region does not necessarily include unevenness but may include unevenness when there is no problem in adhesion. Since the cushioning material is provided, stress applied to the secondary battery when the secondary battery is bent can be relieved.

This embodiment can be freely combined with Embodiment 1.

Embodiment 3

In this embodiment, an example of a secondary battery different from those in the above embodiments will be described with reference to FIGS. 14A to 14C, FIGS. 15A and 15B, and FIG. 16.

A secondary battery 200 illustrated in FIGS. 14A to 14C, FIGS. 15A and 15B, and FIG. 16 includes at least a stack of electrode groups including a plurality of positive electrodes 211 and a plurality of negative electrodes 215. The secondary battery 200 further includes a positive electrode lead 221 electrically connected to the plurality of positive electrodes 211 and a negative electrode lead 225 electrically connected to the plurality of negative electrodes 215. The positive electrodes 211 are each covered with a separator 203.

The secondary battery 200 includes an external body 207 covering the stack of electrode groups. The secondary battery 200 also includes an electrolytic solution 204 in a region covered by the exterior body 207.

The secondary battery 200 includes, as a cushioning material, a first cushioning material 230a, a second cushioning material 230b, and a third cushioning material 230c. The first cushioning material 230a, the second cushioning material 230b, and the third cushioning material 230c have a function of bonding, in a seal region, the external body 207 over the electrode groups to the external body 207 below the electrode groups and a function of keeping the gap between the external body 207 over the electrode groups and the external body 207 below the electrode groups.

Figure 14A:
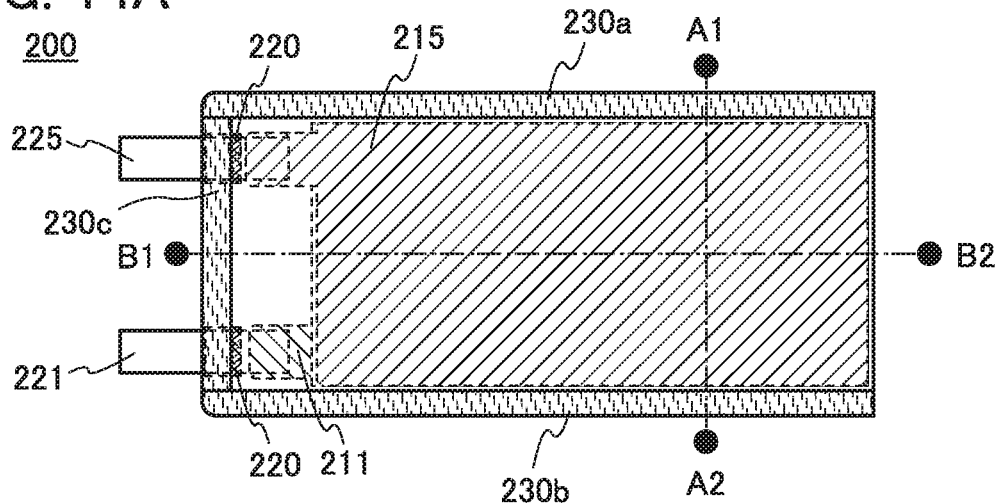
FIGS. 14A to 14C are a top view and cross-sectional views illustrating a structure example of a secondary battery of one embodiment of the present invention.
Figure 14B:
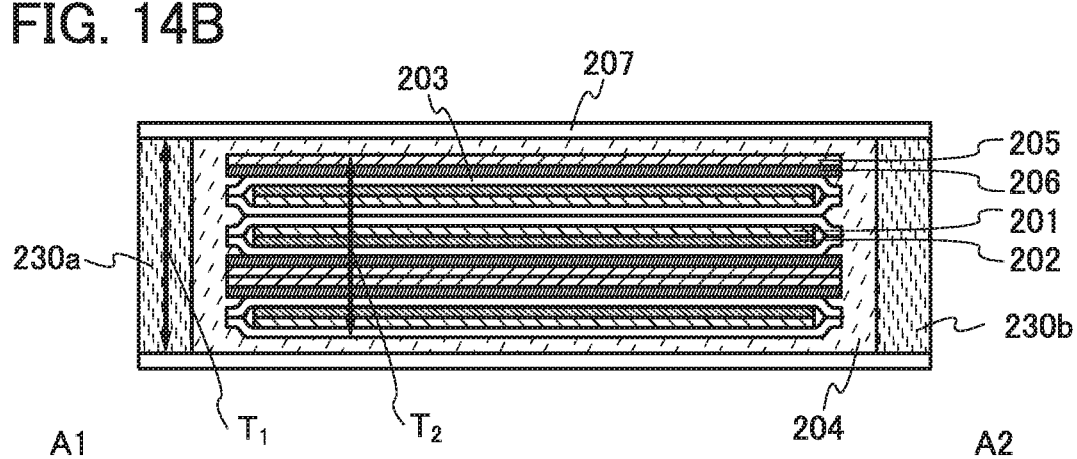
Figure 14C:
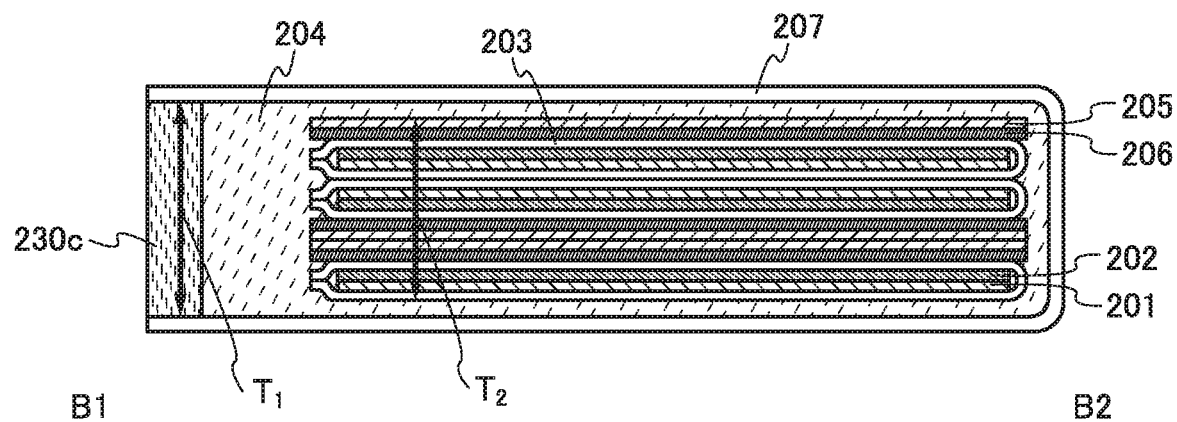

As illustrated in FIGS. 14B and 14C, the thickness of each of the first cushioning material 230a, the second cushioning material 230b, and the third cushioning material 230c in a region sandwiched by the external body 207 is represented by $T_1$, and the thickness of the stack of electrode groups is represented by $T_2$. In the case where the external body 207 has unevenness formed by embossing or the like, the thickness of the thinnest region of the third cushioning material 230c in the region sandwiched by the external body 207 is represented by $T_1$.

The thickness $T_1$ of each of the first cushioning material 230a, the second cushioning material 230b, and the third cushioning material 230c in the region sandwiched by the external body 207 is preferably greater than or equal to 80% and less than or equal to 120%, more preferably greater than or equal to 90% and less than or equal to 110% of the thickness $T_2$ of the electrode groups. The thicknesses of the electrode groups and the seal region of the external body are preferably set close to each other as described above, thereby suppressing generation of wrinkles of the exterior body 207 when the secondary battery 200 is bent.

By suppressing generation of wrinkles of the exterior body 207, cracks or rupture, for example, of the exterior body 207 can be prevented, so that the secondary battery 200 can be highly reliable.

Figure 15A:
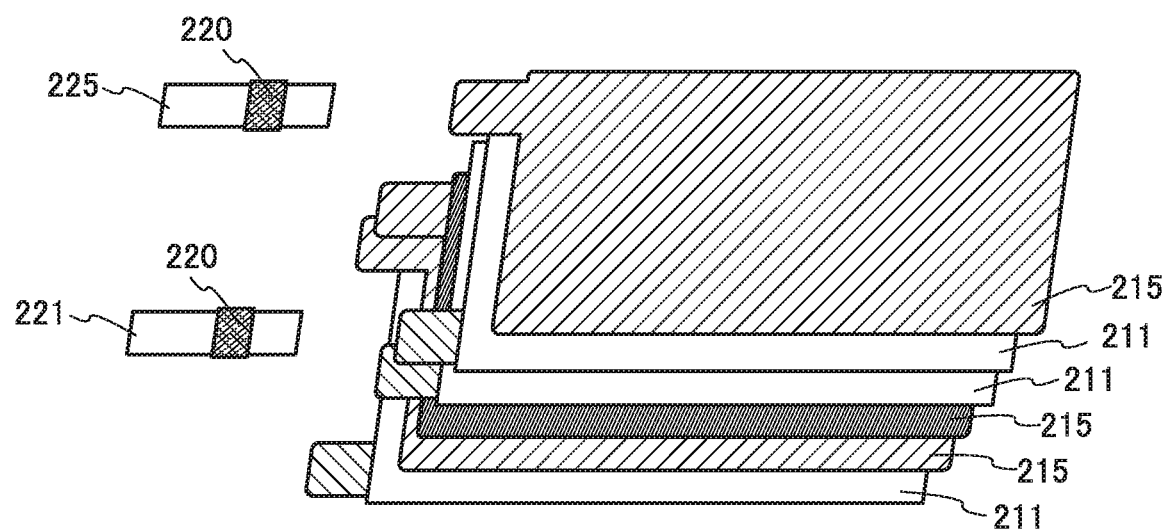
FIG. 15A is a perspective view and FIG. 15B is a top view illustrating a structure example of a secondary battery of one embodiment of the present invention.

As illustrated in FIGS. 14B and 14C and FIG. 15A, the secondary battery 200 includes three positive electrodes 211 in each of which a positive electrode active material layer 202 is formed on one surface of a positive electrode current collector 201 and three negative electrodes 215 in each of which a negative electrode active material layer 206 is formed on one surface of a negative electrode current collector 205. These electrodes may be positioned so that the positive electrode active material layer 202 and the negative electrode active material layer 206 face each other with the separator 203 provided therebetween. Furthermore, the negative electrodes 215 may be positioned so that the surfaces which are not provided with the negative electrode active material layers 206 are in contact with each other.

When the electrodes are positioned as described above, a contact surface between metals such as a contact surface between the surfaces of the negative electrodes 215 which are not provided with the negative electrode active material layers 206 can be formed. The contact surface between metals has a lower coefficient of friction than a contact surface between the active material layer and the separator 203.

When the positive electrode 211 and the negative electrode 215 are bent, the surfaces of the negative electrodes 215 which are not provided with the negative electrode active material layers 206 slide, so that stress caused by the difference between the inner diameter and the outer diameter of a bent portion can be reduced. Accordingly, the positive electrode 211 and the negative electrode 215 can be prevented from deteriorating. In addition, the secondary battery 200 can be highly reliable.

Note that positive electrode tabs of the plurality of positive electrode current collectors 201 and the positive electrode lead 221 provided with a sealing layer 220 are electrically connected to each other by, for example, ultrasonic welding so that they can be stably kept being electrically connected to each other.

The lead electrode is likely to be cracked or cut by stress due to external force that is applied after fabrication of the secondary battery. Therefore, when subjected to ultrasonic welding, the positive electrode lead 221 and the positive electrode tab may be placed between bonding dies provided with projections, so that a connection region and a curved portion may be formed in the positive electrode tab. The curved portion can relieve stress due to external force that is applied after fabrication of the secondary battery 200. Thus, the secondary battery 200 can be highly reliable.

Other than the formation of the curved portion in the positive electrode tab, the following may be employed: the positive electrode current collector is formed using a high-strength material such as stainless steel or titanium to a thickness of less than or equal to 10 µm, so that stress due to external force that is applied after fabrication of the secondary battery can be easily relieved.

It is needless to say that two or more of the above examples may be combined to alleviate the concentration of stress in the positive electrode tab.

As in the case of the positive electrode current collector 201, negative electrode tabs of the plurality of negative electrode current collectors 205 and the negative electrode lead 225 provided with the sealing layer 220 are electrically connected to each other by, for example, ultrasonic welding so that they can be stably kept being electrically connected to each other. Structures which can easily relieve stress can be employed as in the case of the positive electrode current collector 201; for example, the negative electrode tab is provided with a curved portion or the current collector is formed using a high-strength material.

Figure 15B:
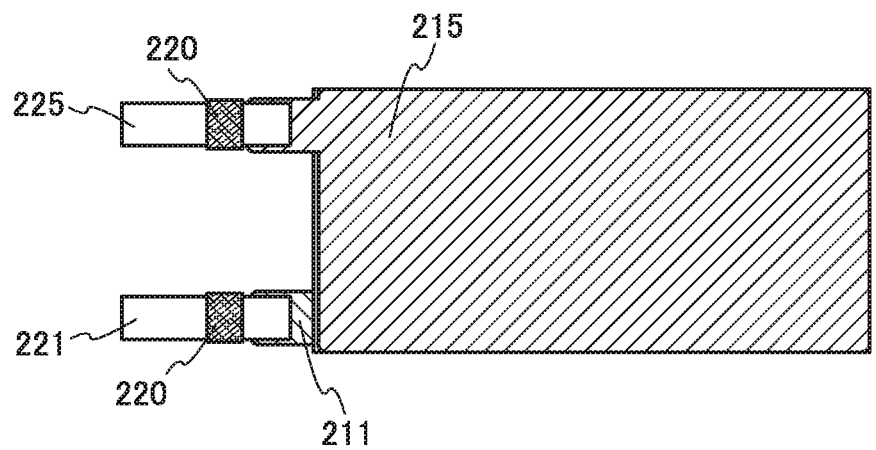
Figure 16:
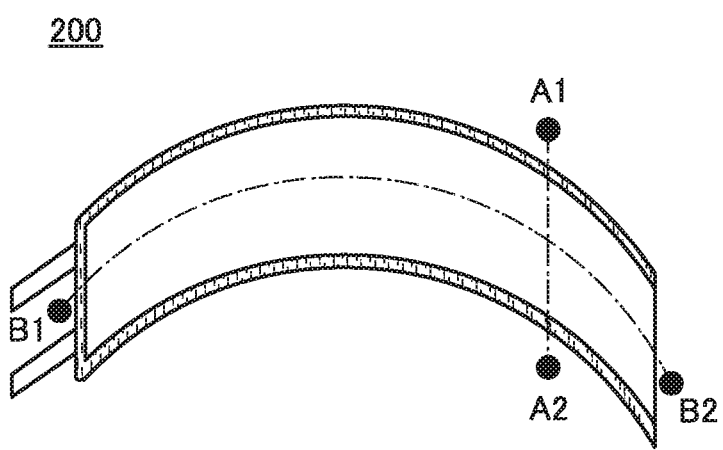
FIG. 16 is a perspective view illustrating a structure example of a secondary battery of one embodiment of the present invention.
Figure 17A:
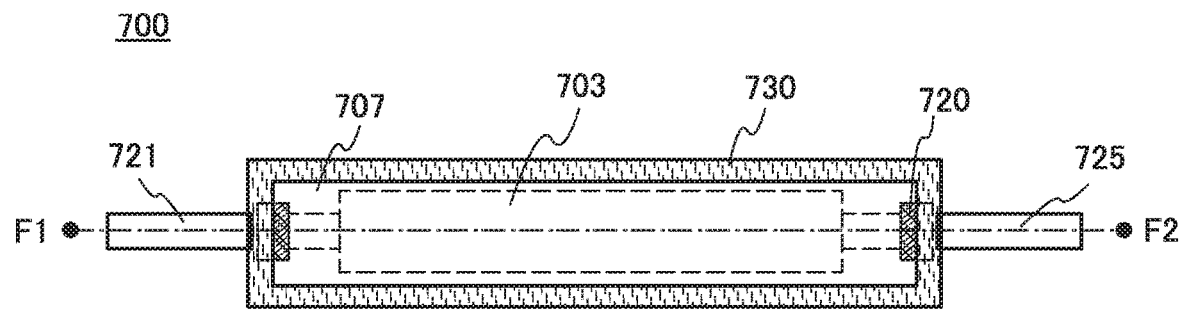
FIGS. 17A to 17C are a top view, a cross-sectional view, and a perspective view illustrating a structure example of a secondary battery of one embodiment of the present invention.
Figure 17B:
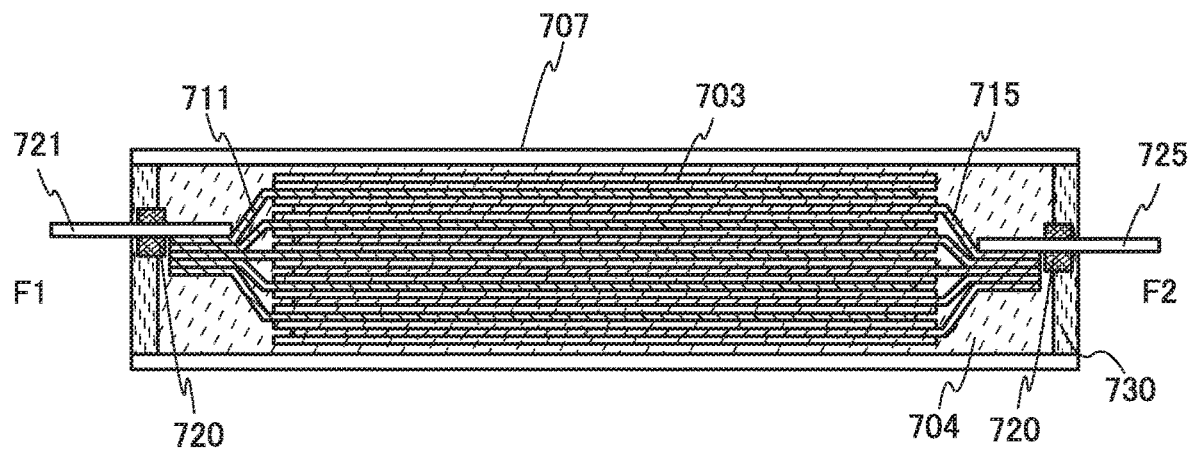
Figure 17C:
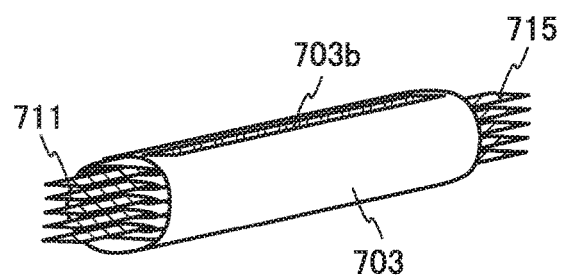

As an example different from that in FIGS. 14A to 14C. FIGS. 15A and 15B, and FIG. 16, a secondary battery 700 different from that in FIGS. 1A to 1D is illustrated in FIGS. 17A to 17C. FIG. 17A is a top view of the secondary battery 700. FIG. 17B is a cross-sectional view along the dashed-and-dotted line F1-F2 in FIG. 17A. FIG. 17C is a perspective view illustrating a positive electrode 711, a negative electrode 715, and a separator 703 of the secondary battery 700.

The secondary battery 700 illustrated in FIGS. 17A to 17C is different from the secondary battery 100 illustrated in FIGS. 1A to 1D in the positions of a positive electrode lead 721 and a negative electrode lead 725 and in the shapes of the positive electrode 711, the negative electrode 715, the separator 703, and an external body 707.

The secondary battery 700 includes a cushioning material 730. The cushioning material 730 is provided in a seal region sandwiched by the external body 707 over an electrode group and the external body 707 below the electrode group and has a function of keeping the gap between the external body 707 over the electrode group and the external body 707 below the electrode group.

The positive electrode lead 721 and the negative electrode lead 725 each penetrate the cushioning material, and a sealing material 720 is provided to prevent impurities from entering the secondary battery from the outside, so that a space surrounded by the external body and the cushioning material can be tightly sealed. In addition, the inside space of the secondary battery is filled with an electrolytic solution 704 as illustrated in FIG. 17B.

Now, some steps in a method for fabricating the secondary battery 700 illustrated in FIGS. 17A to 17C are described with reference to FIGS. 18A to 18D.

First, the negative electrode 715 is positioned over the separator 703 (FIG. 18A) such that a negative electrode active material layer 706 in the negative electrode 715 overlaps with the separator 703.

Then, the separator 703 is folded such that part of the separator 703 is positioned over the negative electrode 715. Next, the positive electrode 711 is positioned over the separator 703 (FIG. 18B) such that a positive electrode active material layer 702 in the positive electrode 711 overlaps with the separator 703 and the negative electrode active material layer 706. In the case where an electrode in which an active material layer is formed on one surface of a current collector is used, the positive electrode active material layer 702 of the positive electrode 711 and the negative electrode active material layer 706 of the negative electrode 715 are positioned so as to face each other with the separator 703 provided therebetween.

Figure 18A:
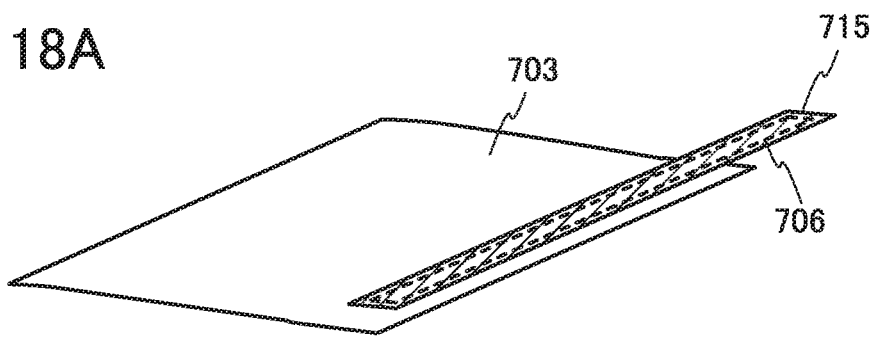
FIGS. 18A to 18D illustrate an example of a method for fabricating a secondary battery of one embodiment of the present invention.
Figure 18B:
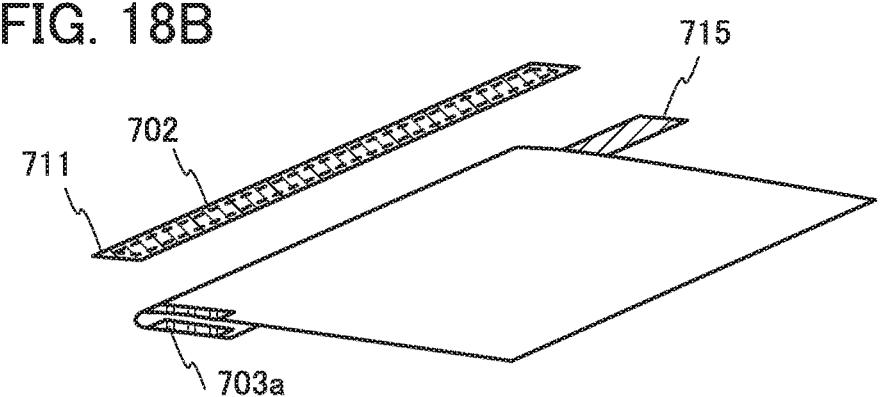

As illustrated in FIGS. 18A and 18B, the positive electrode active material layer 702 and the negative electrode active material layer 706 are not provided in the peripheral regions but provided in the inner regions of the positive electrode 711 and the negative electrode 715, respectively. However, one embodiment of the present invention is not limited thereto; for example, the positive electrode active material layer 702 and the negative electrode active material layer 706 may be provided so as to extend to the end portions of the current collectors for the positive electrode 711 and the negative electrode 715, as long as connection regions for the positive electrode lead 721 and the negative electrode lead 725 can be secured.

In the case where the separator 703 is formed using a material that can be thermally welded, such as polypropylene, a region where the separator 703 overlaps with itself is thermally welded and then another electrode is positioned so as to overlap with the separator 703, whereby the slippage of the electrode in the fabrication process can be minimized. Specifically, a region which does not overlap with the negative electrode 715 or the positive electrode 711 and in which the separator 703 overlaps with itself, e.g., a region 703a in FIG. 18B, is preferably thermally welded.

Figure 18C:
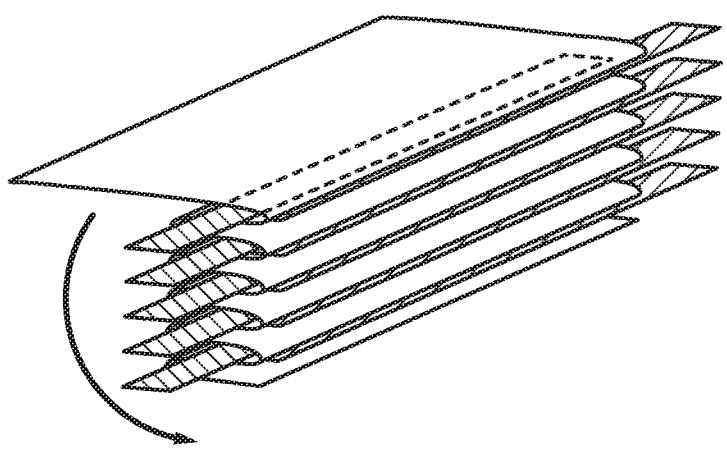

By repeating the above steps, the positive electrode 711 and the negative electrode 715 can overlap with each other with the separator 703 provided therebetween as illustrated in FIG. 18C.

Note that a plurality of positive electrodes 711 and a plurality of negative electrodes 715 may be placed to be alternately sandwiched by the separator 703 that is repeatedly folded in advance.

Next, as illustrated in FIG. 18C, the plurality of positive electrodes 711 and the plurality of negative electrodes 715 are covered with the separator 703.

Figure 18D:
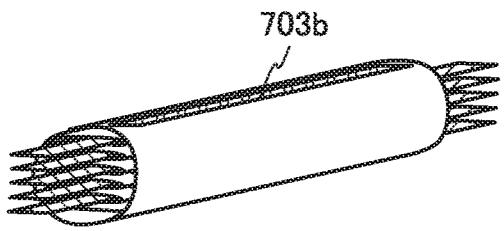

Then, as illustrated in FIG. 18D, a region where the separator 703 overlaps with itself, e.g., a region 703b in FIG. 18D, is thermally welded, and the plurality of positive electrodes 711 and the plurality of negative electrodes 715 are covered with the separator 703 to be bound.

Note that the plurality of positive electrodes 711, the plurality of negative electrodes 715, and the separator 703 may also be bound with a binding material.

Since the positive electrodes 711 and the negative electrodes 715 are stacked through the above steps, one separator 703 has regions sandwiched between the plurality of positive electrodes 711 and the plurality of negative electrodes 715 and regions positioned so as to cover the plurality of positive electrodes 711 and the plurality of negative electrodes 715.

The description in the above embodiments can be referred to for the structures in the secondary battery 700 except the shapes of the positive electrodes 711, the negative electrodes 715, the separator 703, and the exterior body 707, and the positions and shapes of the positive electrode lead 721 and the negative electrode lead 725.

Embodiment 4

In this embodiment, examples of an electronic device incorporating any of the secondary batteries described in Embodiments 1 to 3 will be described.

Examples of an electronic device including a secondary battery include display devices (also referred to as televisions or television receivers) such as head-mounted displays and goggle type displays, personal computers such as desktop personal computers and laptop personal computers, monitors for computers or the like, cameras such as digital cameras and digital video cameras, digital photo frames, electronic notebooks, e-book readers, electronic translators, toys, audio input devices such as microphones, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, alarm devices such as smoke detectors, gas alarm devices, and security alarm devices, industrial robots, health equipment and medical equipment such as hearing aids, cardiac pacemakers, X-ray equipment, radiation counters, electric massagers, and dialyzers, mobile phones (also referred to as mobile phone devices or cell phones), portable game machines, portable information terminals, lighting devices, headphone stereos, stereos, remote controls, clocks such as table clocks and wall clocks, cordless phone handsets, transceivers, pedometers, calculators, portable or stationary music reproduction devices such as digital audio players, and large game machines such as pachinko machines.

The secondary battery fabricated according to any of Embodiments 1 to 3 can include, as an exterior body, a thin flexible film and thus can be bonded to a support structure body with a curved surface and change its shape along the curved surface of a region of the support structure body, which has a large radius of curvature.

In addition, a flexible secondary battery can be incorporated along a curved inside/outside wall surface of a house or a building or a curved interior/exterior surface of an automobile.

Figure 10A:
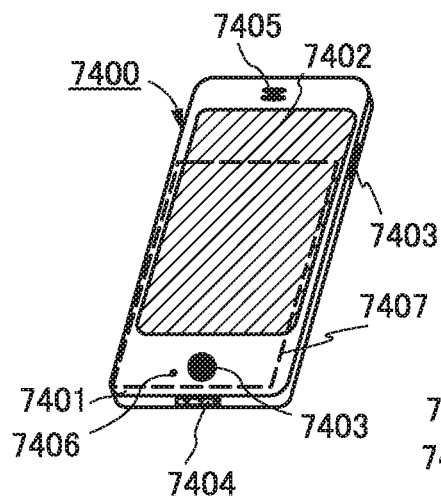
FIGS. 10A to 10H are perspective external views each illustrating an electronic device of one embodiment of the present invention.

FIG. 10A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a secondary battery 7407.

Figure 10B:
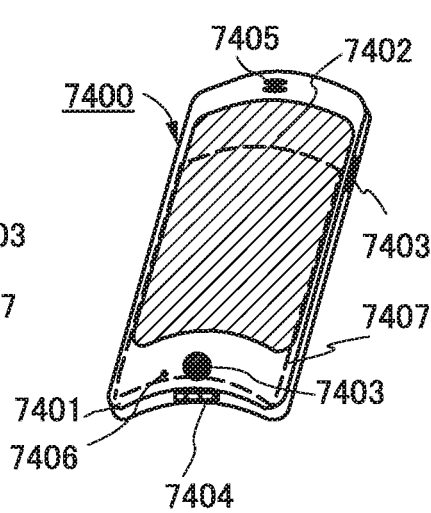
Figure 10C:
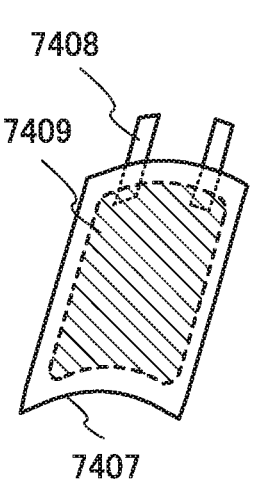

The mobile phone 7400 illustrated in FIG. 10B is bent. When the whole mobile phone 7400 is bent by external force, the secondary battery 7407 included in the mobile phone 7400 is also bent. FIG. 10C illustrates the bent secondary battery 7407. The secondary battery 7407 is a laminated secondary battery (also referred to as a layered battery or a film-covered battery). The secondary battery 7407 is fixed while being curved. Note that the secondary battery 7407 includes a lead electrode 7408 electrically connected to a current collector 7409. For example, a cushioning material is provided in a region sandwiched by a film serving as an exterior body of the secondary battery 7407, so that the secondary battery 7407 has high reliability even when being curved. The mobile phone 7400 may further be provided with a slot for insertion of a SIM card, a connector portion for connecting a USB device such as a USB memory, or the like.

Figure 10D:
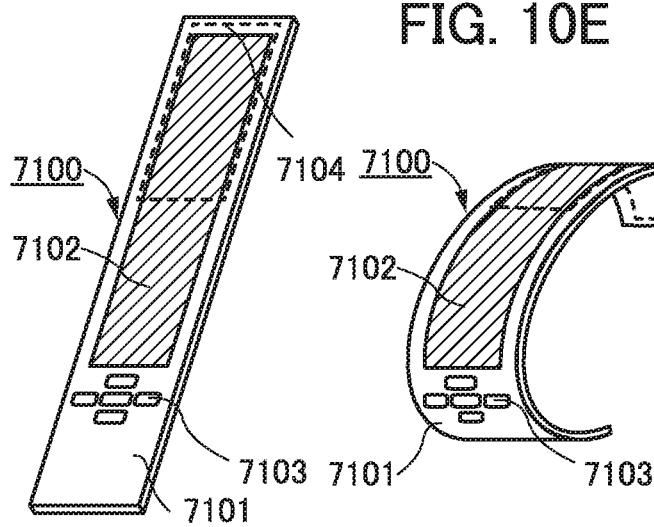
Figure 10E:
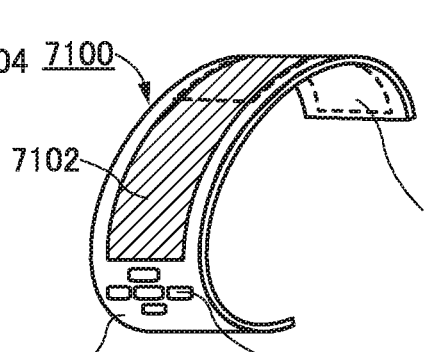
Figure 10F:
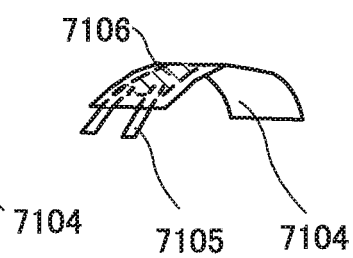

FIG. 10D illustrates an example of a bendable mobile phone. When bent to be put around a forearm, the mobile phone can be used as a bangle-type mobile phone as illustrated in FIG. 10E. A mobile phone 7100 includes a housing 7101, a display portion 7102, an operation button 7103, and a secondary battery 7104. FIG. 10F illustrates a bendable secondary battery 7104. When the mobile phone is worn on a user's arm while the secondary battery 7104 is bent, the housing changes its shape and the curvature of part of or the whole secondary battery 7104 is changed. Specifically, part of or the whole housing or main surface of the secondary battery 7104 changes its shape in the range of radius of curvature from 10 mm to 150 mm. Note that the secondary battery 7104 includes a lead electrode 7105 electrically connected to a current collector 7106. For example, a cushioning material is provided in a region sandwiched by a film serving as an exterior body of the secondary battery 7104, so that the secondary battery 7104 can be highly reliable even after being bent many times with different curvatures. As described above, the mobile phone illustrated in FIG. 10D can change its shape in more than one way, and it is desirable that at least the housing 7101, the display portion 7102, and the secondary battery 7104 have flexibility in order to change the shape of the mobile phone.

The mobile phone 7100 may further be provided with a slot for insertion of a SIM card, a connector portion for connecting a USB device such as a USB memory, or the like.

Figure 10G:
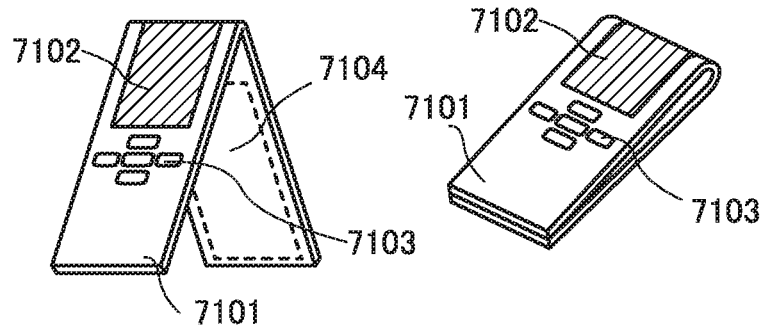
Figure 10H:
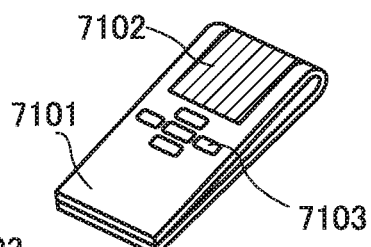
Figure 11A:
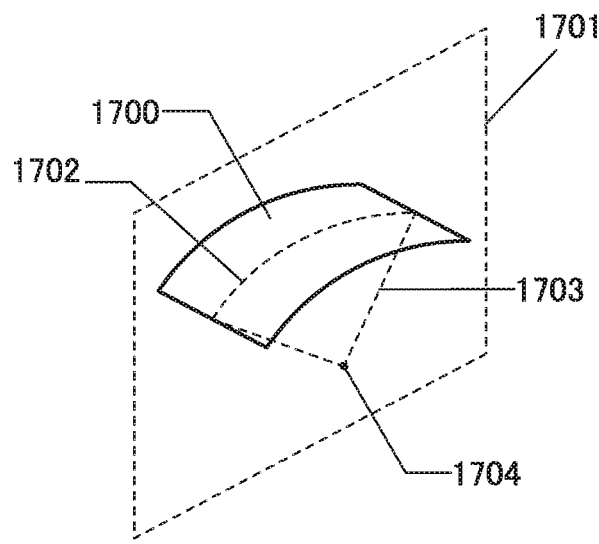
FIGS. 11A to 11C illustrate a radius of curvature of a surface.
Figure 11B:
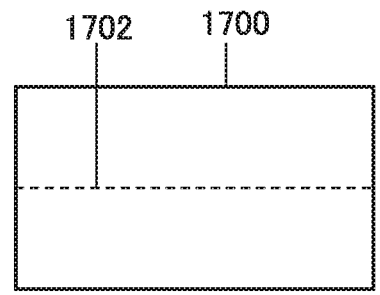
Figure 11C:
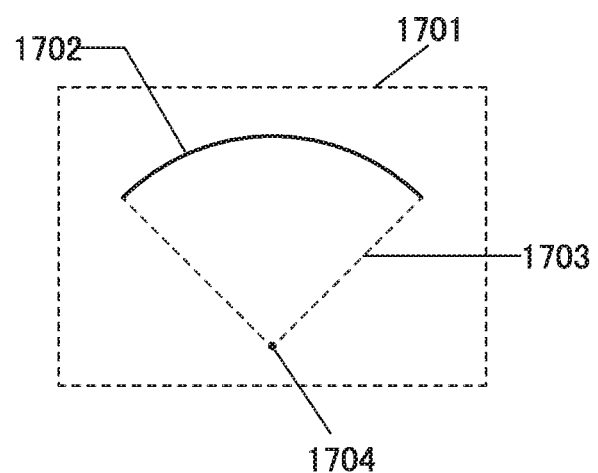
Figure 12A:
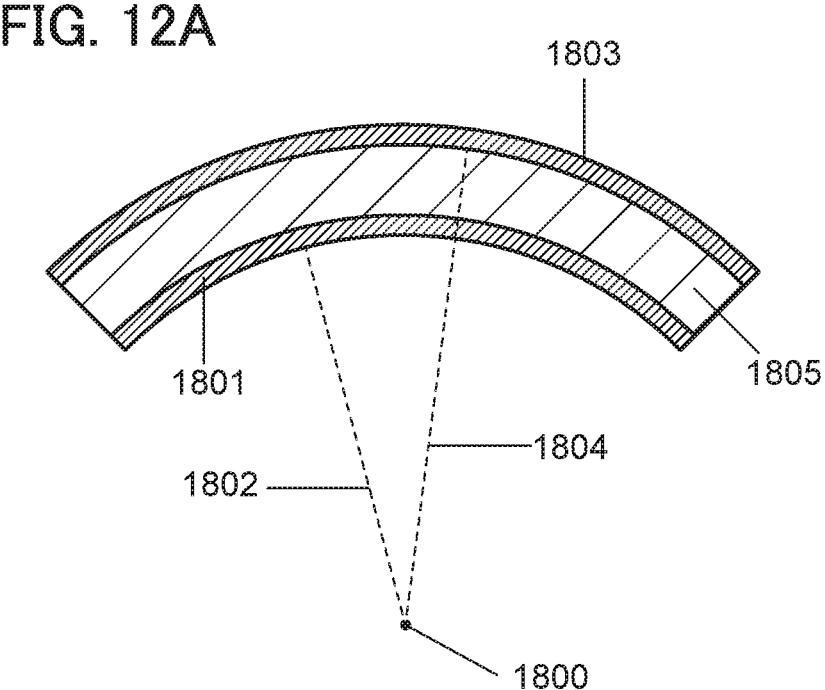
FIGS. 12A to 12D each illustrate a cross section of a secondary battery.
Figure 12B:
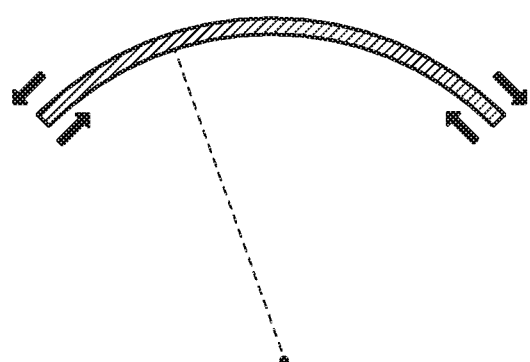
Figure 12C:
Figure 12D:
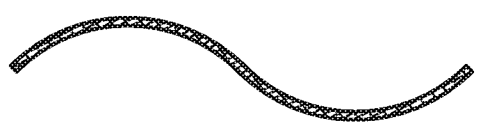

Other usage examples of the mobile phone are described. When a center portion of the mobile phone illustrated in FIG. 10D is bent, a shape illustrated in FIG. 10G can be obtained. When a center portion of the mobile phone is further folded so that end portions of the mobile phone overlap with each other as illustrated in FIG. 10H, the mobile phone can be reduced in size so as to be put in, for example, a pocket of clothes a user wears. In the cases of only the shapes illustrated in FIGS. 10D, 10G, and 10H, the secondary battery 7104 is not being bent. When a mobile phone that is thin falls or has any other impact, the secondary battery 7104 provided therein is also shocked. A cushioning material that is provided in a region sandwiched by a film serving as an exterior body of the secondary battery 7104 relieves such an impact, and the use of the cushioning material enables fabrication of a durable secondary battery. Thus, the use of the secondary battery 7104 provided with a cushioning material in a region sandwiched by a film serving as an exterior body allows fabrication of a mobile phone that is highly reliable regardless of whether the mobile phone is bent or not.

Figure 13A:
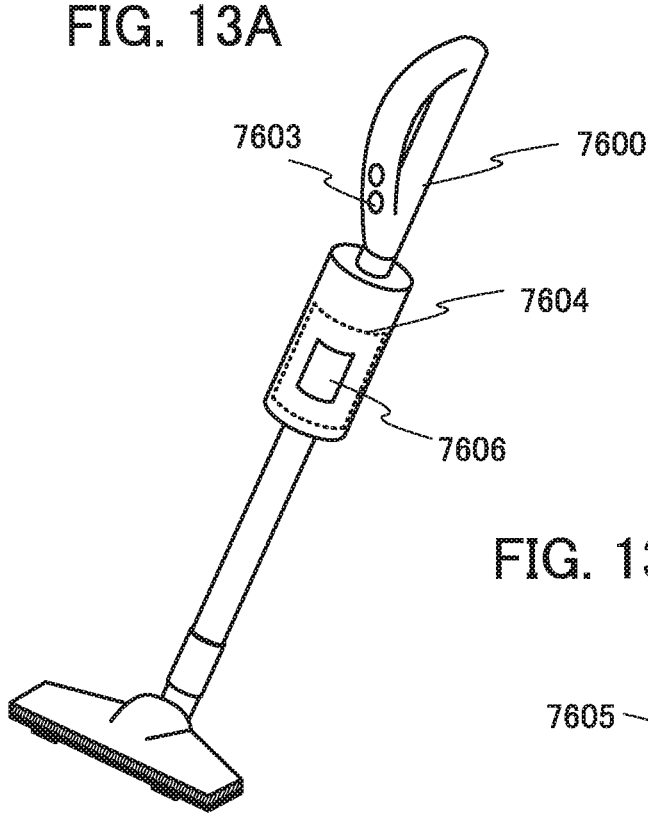
FIGS. 13A to 13C illustrate an electronic device of one embodiment of the present invention.

FIG. 13A illustrates an example of a vacuum cleaner. By being provided with a secondary battery, the vacuum cleaner can be cordless. To secure a dust collecting space for storing vacuumed dust inside the vacuum cleaner, a space occupied by a secondary battery 7604 is preferably as small as possible. For this reason, it is useful to provide the thin and bendable secondary battery 7604 between the outside surface and the dust collecting space.

Figure 13B:
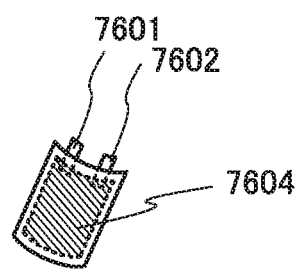

The vacuum cleaner 7600 is provided with an operation button 7603 and the secondary battery 7604. FIG. 13B illustrates the bendable secondary battery 7604. A cushioning material is provided in a region sandwiched by a film serving as an exterior body of the secondary battery 7604, so that the secondary battery 7604 has high reliability even when being curved. The secondary battery 7604 includes a lead electrode 7601 electrically connected to a negative electrode and a lead electrode 7602 electrically connected to a positive electrode.

Figure 13C:
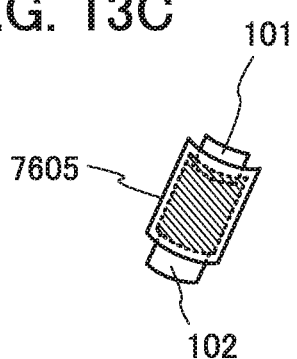

As an example of a secondary battery in which one lead electrode is exposed from each shorter side of an exterior body, a bendable secondary battery 7605 is illustrated in FIG. 13C. In the secondary battery 7605, a current collector or a lead electrode is exposed from each of two shorter sides of an exterior body. A cushioning material is provided in a region sandwiched by a film serving as the exterior body of the secondary battery 7605, so that the secondary battery 7605 has high reliability even when being curved.

The thin secondary battery 7604 can be fabricated by the method for fabricating a laminated secondary battery that is described in Embodiment 3.

The thin secondary battery 7604 has a laminated structure and is fixed while being curved. The vacuum cleaner 7600 includes a display portion 7606 that displays, for example, the remaining amount of power in the thin secondary battery 7604. A display area of the display portion 7606 is also curved to fit with the shape of the outer surface of the vacuum cleaner. The vacuum cleaner includes a connection cord for being connected to a receptacle. When the thin secondary battery 7604 is charged to have sufficient power, the connection cord can be removed from the receptacle to use the vacuum cleaner. The thin secondary battery 7604 may be charged wirelessly without using the connection cord. The cushioning material provided in the region sandwiched by the film serving as the exterior body of the secondary battery 7604 allows the secondary battery 7604 to be shock-resistant and highly reliable.

The use of bendable secondary batteries in vehicles enables production of next-generation clean energy vehicles such as hybrid electric vehicles (HEVs), electric vehicles (EVs), and plug-in hybrid electric vehicles (PHEVs). Moreover, bendable secondary batteries can also be used in moving objects such as agricultural machines, motorized bicycles including motor-assisted bicycles, motorcycles, electric wheelchairs, electric carts, boats or ships, submarines, aircrafts such as fixed-wing aircrafts and rotary-wing aircrafts, rockets, artificial satellites, space probes, planetary probes, and spacecrafts.

Embodiment 5

In this embodiment, examples of a vehicle incorporating any of the secondary batteries described in Embodiments 1 to 3 will be described.

The use of secondary batteries in vehicles enables production of next-generation clean energy vehicles such as hybrid electric vehicles (HEVs), electric vehicles (EVs), and plug-in hybrid electric vehicles (PHEVs).

Figure 19A:
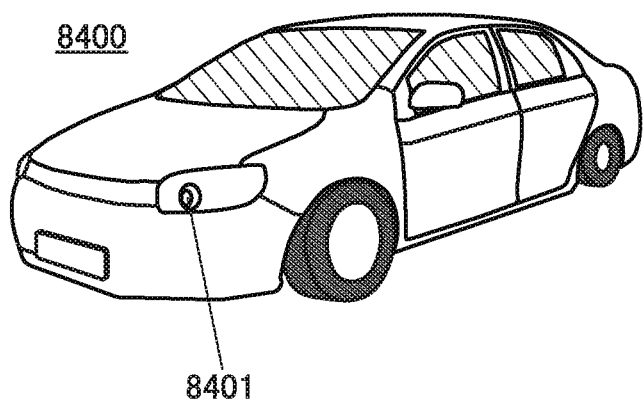
FIGS. 19A and 19B illustrate an example of an electronic device of one embodiment of the present invention.
Figure 19B:
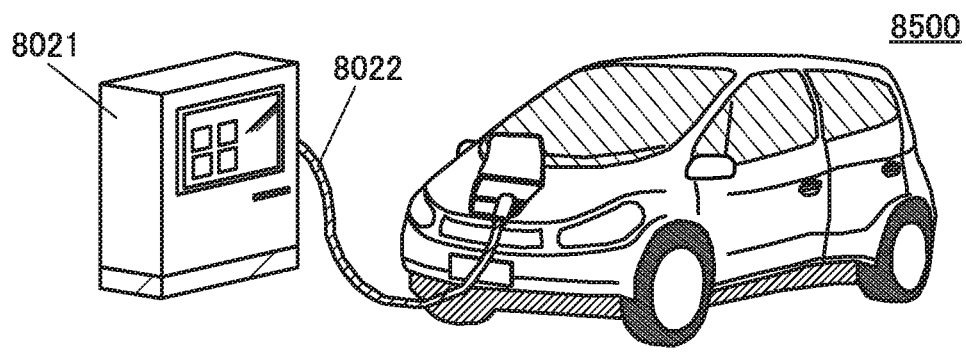

FIGS. 19A and 19B each illustrate an example of a vehicle fabricated in accordance with one embodiment of the present invention. An automobile 8400 illustrated in FIG. 19A is an electric vehicle which runs on the power of the electric motor. Alternatively, the automobile 8400 is a hybrid electric vehicle which runs on either the power of the electric motor or the engine as appropriate. One embodiment of the present invention achieves a high-mileage vehicle. The automobile 8400 includes a secondary battery. The secondary battery is used not only for driving the electric motor, but also for supplying electric power to a light-emitting device such as a headlight 8401 or a room light (not illustrated).

The secondary battery can also supply electric power to a display device included in the automobile 8400, such as a speedometer or a tachometer. Furthermore, the secondary battery can supply electric power to a semiconductor device included in the automobile 8400, such as a navigation system.

An automobile 8500 illustrated in FIG. 19B can be charged when a secondary battery included in the automobile 8500 is supplied with electric power through external charging equipment by a plug-in system, a contactless power supply system, or the like. In FIG. 19B, the secondary battery included in the automobile 8500 is charged with the use of ground-based charging equipment 8021 through a cable 8022. In charging, a given method such as CHAdeMO (registered trademark) or Combined Charging System may be employed as a charging method, the standard of a connector, or the like as appropriate. The charging equipment 8021 may be a charging station provided in a commerce facility or a power source in a house. For example, with the use of a plug-in technique, the secondary battery (not illustrated) included in the automobile 8500 can be charged by being supplied with electric power from the outside. The charging can be performed by converting AC electric power into DC electric power through a converter such as an AC-DC converter.

Although not illustrated, the vehicle may include a power receiving device so as to be charged by being supplied with electric power from above-ground power transmitting equipment in a contactless manner. In the case of the contactless power supply system, by fitting the power transmitting equipment in a road or an exterior wall, charging can be performed not only when the vehicle stops but also when it moves. In addition, the contactless power supply system may be utilized to perform transmission and reception of electric power between vehicles. Furthermore, a solar cell may be provided in the exterior of the vehicle to charge the secondary battery when the vehicle stops or moves. To supply electric power in such a contactless manner, an electromagnetic induction method or a magnetic resonance method can be used.

In accordance with one embodiment of the present invention, the secondary battery can have improved cycle characteristics and reliability. Furthermore, in accordance with one embodiment of the present invention, the secondary battery itself can be made more compact and lightweight as a result of improved characteristics of the secondary battery. The compact and lightweight secondary battery contributes to a reduction in weight of a vehicle and thus increases the mileage. Furthermore, the secondary battery included in the vehicle can be used as a power source for supplying electric power to products other than the vehicle. In that case, the use of a commercial power source can be avoided at peak time of electric power demand.

This embodiment can be implemented in an appropriate combination with any of the structures described in the other embodiments.

Embodiment 6

In this embodiment, a battery management unit (BMU) which can be combined with a battery cell including at least the secondary battery described in any of the above embodiments and a transistor suitable for a circuit included in the battery management unit will be described with reference to FIG. 20, FIGS. 21A to 21C, FIG. 22, FIG. 23, FIGS. 24A to 24C, FIG. 25, and FIG. 26. In this embodiment, in particular, a battery management unit of a power storage device including battery cells that are connected in series will be described.

When a plurality of battery cells connected in series are charged and discharged repeatedly, the battery cells have different capacity (output voltages) from each other due to the variation in characteristics among the battery cells. The capacity of all the battery cells connected in series at the time of discharging depends on the capacity of a battery cell with small capacity. The variation in capacity among the battery cells reduces the capacity of all the battery cells at the time of discharging. Charging based on a battery cell with small capacity may cause insufficient charging. Charging based on a battery cell with high capacity may cause overcharge.

Thus, the battery management unit of the power storage device including the battery cells connected in series has a function of reducing variation in capacity among the battery cells which causes insufficient charging or overcharge. Although circuit structures for reducing variation in capacity among the battery cells include a resistive type, a capacitor type, and an inductor type, here, a circuit structure which can reduce variation in capacity among the battery cells using a transistor with a small off-state current is described as an example.

As the transistor with a small off-state current, a transistor including an oxide semiconductor in its channel formation region (an OS transistor) is preferably used. When an OS transistor with a small off-state current is used in the circuit of the battery management unit of the power storage device, the amount of electric charge leaking from a battery can be reduced, and a reduction in capacity with the lapse of time can be suppressed.

As the oxide semiconductor used in the channel formation region, an In-M-Zn oxide (M is Ga, Y, Zr, La, Ce, or Nd) is used. In the case where the atomic ratio of the metal elements of a target for forming an oxide semiconductor film is In:M:Zn=$x_1$:$y_1$:$z_1$, $x_1/y_1$ is preferably greater than or equal to ⅓ and less than or equal to 6, more preferably greater than or equal to 1 and less than or equal to 6, and $z_1/y_1$ is preferably greater than or equal to ⅓ and less than or equal to 6, more preferably greater than or equal to 1 and less than or equal to 6. Note that when $z_1/y_1$ is greater than or equal to 1 and less than or equal to 6, a CAAC-OS film as the oxide semiconductor film is easily formed.

Here, the details of the CAAC-OS film are described.

The CAAC-OS film is one of oxide semiconductor films having a plurality of c-axis aligned crystal parts.

With a transmission electron microscope (TEM), a combined analysis image (also referred to as a high-resolution TEM image) of a bright-field image and a diffraction pattern of the CAAC-OS film is observed. Consequently, a plurality of crystal parts are observed clearly. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in a direction substantially parallel to a sample surface, metal atoms are arranged in a layered manner in the crystal parts. Each metal atom layer has a morphology that reflects a surface over which the CAAC-OS film is formed (hereinafter, a surface over which the CAAC-OS film is formed is referred to as a formation surface) or a top surface of the CAAC-OS film, and is arranged parallel to the formation surface or the top surface of the CAAC-OS film.

On the other hand, according to the high-resolution planar TEM image of the CAAC-OS film observed in a direction substantially perpendicular to the sample surface, metal atoms are arranged in a triangular or hexagonal configuration in the crystal parts. However, there is no regularity of arrangement of metal atoms between different crystal parts.

A CAAC-OS film is subjected to structural analysis with an X-ray diffraction (XRD) apparatus. For example, when the CAAC-OS film including an $InGaZnO_4$ crystal is analyzed by an out-of-plane method, a peak may appear when the diffraction angle (2θ) is around 31°. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

Note that when the CAAC-OS film including an $InGaZnO_4$ crystal is analyzed by an out-of-plane method, a peak may appear when 2θ is around 36°, in addition to the peak at 2θ of around 31°. The peak at 2θ of around 36° indicates that a crystal having no c-axis alignment is included in part of the CAAC-OS film. It is preferable that in the CAAC-OS film, a peak appear when 2θ is around 31° and that a peak not appear when 2θ is around 36°.

The CAAC-OS film is an oxide semiconductor film having a low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic arrangement of the oxide semiconductor film by depriving the oxide semiconductor film of oxygen and causes a decrease in crystallinity. Furthermore, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein.

The state in which the impurity concentration is low and the density of defect states is low (the number of oxygen vacancies is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Thus, a transistor including the oxide semiconductor film rarely has negative threshold voltage (is rarely normally on). The highly purified intrinsic or substantially highly purified intrinsic oxide semiconductor film has few carrier traps. Accordingly, the transistor including the oxide semiconductor film has little variation in electrical characteristics and high reliability. Electric charge trapped by the carrier traps in the oxide semiconductor film takes a long time to be released, and might behave like fixed electric charge. Thus, the transistor which includes the oxide semiconductor film having a high impurity concentration and a high density of defect states has unstable electrical characteristics in some cases.

With the use of the CAAC-OS film in a transistor, variation in electrical characteristics of the transistor due to irradiation with visible light or ultraviolet light is small.

Since an OS transistor has a wider band gap than a transistor including silicon in its channel formation region (a Si transistor), dielectric breakdown is unlikely to occur when a high voltage is applied. A voltage of several hundreds of volts is generated when battery cells are connected in series, and the above-described OS transistor is suitable for a circuit of a battery management unit which is used for such battery cells in the power storage device.

Figure 20:
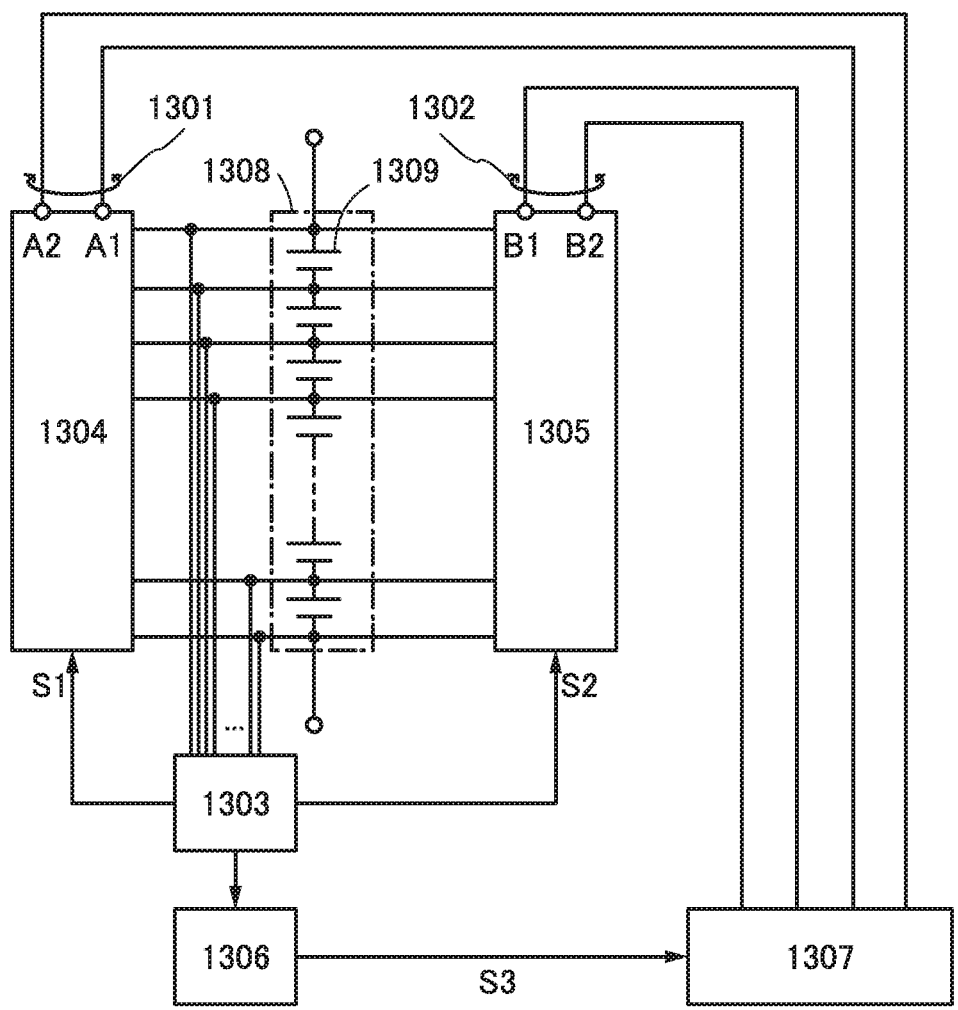
FIG. 20 is a block diagram showing one embodiment of the present invention.

FIG. 20 is an example of a block diagram of the power storage device. A power storage device 1300 shown in FIG. 20 includes a terminal pair 1301, a terminal pair 1302, a switching control circuit 1303, a switching circuit 1304, a switching circuit 1305, a voltage transformation control circuit 1306, a voltage transformer circuit 1307, and a battery portion 1308 including a plurality of battery cells 1309 connected in series.

In the power storage device 1300 shown in FIG. 20, a portion including the terminal pair 1301, the terminal pair 1302, the switching control circuit 1303, the switching circuit 1304, the switching circuit 1305, the voltage transformation control circuit 1306, and the voltage transformer circuit 1307 can be referred to as a battery management unit.

The switching control circuit 1303 controls operations of the switching circuits 1304 and 1305. Specifically, the switching control circuit 1303 selects battery cells to be discharged (a discharge battery cell group) and battery cells to be charged (a charge battery cell group) in accordance with a voltage measured for each battery cell 1309.

The switching control circuit 1303 outputs a control signal S1 and a control signal S2 on the basis of the selected discharge battery cell group and the selected charge battery cell group. The control signal S1 is output to the switching circuit 1304. The control signal S1 controls the switching circuit 1304 so that the terminal pair 1301 and the discharge battery cell group are connected. The control signal S2 is output to the switching circuit 1305. The control signal S2 controls the switching circuit 1305 so that the terminal pair 1302 and the charge battery cell group are connected.

The switching control circuit 1303 generates the control signal S1 and the control signal S2 on the basis of connection relation of the switching circuit 1304, the switching circuit 1305, and the voltage transformer circuit 1307 so that terminals having the same polarity of the terminal pair 1301 and the discharge battery cell group are connected to each other, or terminals having the same polarity of the terminal pair 1302 and the charge battery cell group are connected to each other.

An operation of the switching control circuit 1303 is described in detail.

First, the switching control circuit 1303 measures the voltage of each of the plurality of battery cells 1309. Then, the switching control circuit 1303 determines that the battery cell 1309 having a voltage higher than or equal to a predetermined threshold value is a high-voltage battery cell (high-voltage cell) and that the battery cell 1309 having a voltage lower than the predetermined threshold value is a low-voltage battery cell (low-voltage cell), for example.

As a method for determining whether the battery cell is a high-voltage cell or a low-voltage cell, any of various methods can be employed. For example, the switching control circuit 1303 may determine whether each battery cell 1309 is a high-voltage cell or a low-voltage cell on the basis of the voltage of the battery cell 1309 having the highest voltage or the lowest voltage among the plurality of battery cells 1309. In that case, the switching control circuit 1303 can determine whether each battery cell 1309 is a high-voltage cell or a low-voltage cell by, for example, determining whether or not a ratio of the voltage of each battery cell 1309 to the reference voltage is the predetermined value or more. Then, the switching control circuit 1303 determines the discharge battery cell group and the charge battery cell group on the basis of the determination results.

Note that high-voltage cells and low-voltage cells are mixed in various states in the plurality of battery cells 1309. For example, the switching control circuit 1303 selects a portion having the largest number of high-voltage cells connected in series as the discharge battery cell group in the mixed high-voltage cells and low-voltage cells. In addition, the switching control circuit 1303 selects a portion having the largest number of low-voltage cells connected in series as the charge battery cell group. Alternatively, the switching control circuit 1303 may preferentially select the battery cells 1309 which are near overcharge or overdischarge as the discharge battery cell group or the charge battery cell group.

Figure 21A:
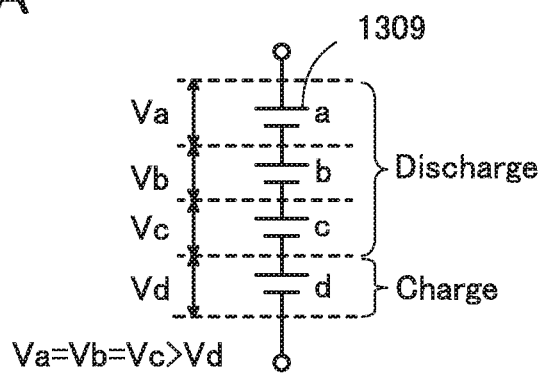
FIGS. 21A to 21C are schematic views each illustrating one embodiment of the present invention.
Figure 21B:
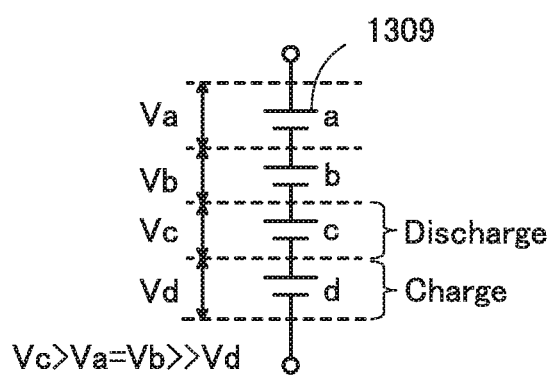
Figure 21C:
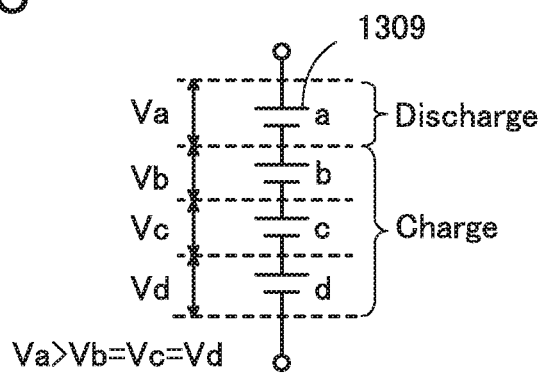

Here, operation examples of the switching control circuit 1303 in this embodiment are described with reference to FIGS. 21A to 21C. FIGS. 21A to 21C illustrate operation examples of the switching control circuit 1303. Note that FIGS. 21A to 21C each illustrate the case where four battery cells 1309 are connected in series as an example for convenience of explanation.

FIG. 21A illustrates the case where the relation of voltages Va, Vb, Vc, and Vd is Va=Vb=Vc>Vd where the voltages Va, Vb, Vc, and Vd are voltages of a battery cell 1309a, a battery cell 1309b, a battery cell 1309c, and a battery cell 1309d, respectively. That is, a series of three high-voltage cells 1309a to 1309c and one low-voltage cell 1309d are connected in series. In that case, the switching control circuit 1303 selects the series of three high-voltage cells 1309a to 1309c as the discharge battery cell group. In addition, the switching control circuit 1303 selects the low-voltage cell 1309d as the charge battery cell group.

FIG. 21B illustrates the case where the relation of the voltages is Vc>Va=Vb>>Vd. That is, a series of two low-voltage cells 1309a and 1309b, one high-voltage cell 1309c, and one low-voltage cell 1309d which is close to overdischarge are connected in series. In that case, the switching control circuit 1303 selects the high-voltage cell 1309c as the discharge battery cell group. Since the low-voltage cell 1309d is close to overdischarge, the switching control circuit 1303 preferentially selects the low-voltage cell 1309d as the charge battery cell group instead of the series of two low-voltage cells 1309a and 1309b.

FIG. 21C illustrates the case where the relation of the voltages is Va>Vb=Vc=Vd. That is, one high-voltage cell 1309a and a series of three low-voltage cells 1309b to 1309d are connected in series. In that case, the switching control circuit 1303 selects the high-voltage cell 1309a as the discharge battery cell group. In addition, the switching control circuit 1303 selects the series of three low-voltage cells 1309b to 1309d as the charge battery cell group.

On the basis of the determination results illustrated in the examples of FIGS. 21A to 21C, the switching control circuit 1303 outputs the control signal S1 and the control signal S2 to the switching circuit 1304 and the switching circuit 1305, respectively. Information showing the discharge battery cell group which is the connection destination of the switching circuit 1304 is set in the control signal S1. Information showing the charge battery cell group which is the connection destination of the switching circuit 1305 is set in the control signal S2.

The above is the detailed description of the operation of the switching control circuit 1303.

The switching circuit 1304 sets the discharge battery cell group selected by the switching control circuit 1303 as the connection destination of the terminal pair 1301 in response to the control signal S1 output from the switching control circuit 1303.

The terminal pair 1301 includes a pair of terminals A1 and A2. The switching circuit 1304 sets the connection destination of the terminal pair 1301 by connecting one of the pair of terminals A1 and A2 to a positive electrode terminal of the battery cell 1309 positioned on the most upstream side (on the high potential side) of the discharge battery cell group, and the other to a negative electrode terminal of the battery cell 1309 positioned on the most downstream side (on the low potential side) of the discharge battery cell group. Note that the switching circuit 1304 can recognize the position of the discharge battery cell group on the basis of the information set in the control signal S1.

The switching circuit 1305 sets the charge battery cell group selected by the switching control circuit 1303 as the connection destination of the terminal pair 1302 in response to the control signal S2 output from the switching control circuit 1303.

The terminal pair 1302 includes a pair of terminals B1 and B2. The switching circuit 1305 sets the connection destination of the terminal pair 1302 by connecting one of the pair of terminals B1 and B2 to a positive electrode terminal of the battery cell 1309 positioned on the most upstream side (on the high potential side) of the charge battery cell group, and the other to a negative electrode terminal of the battery cell 1309 positioned on the most downstream side (on the low potential side) of the charge battery cell group. Note that the switching circuit 1305 can recognize the position of the charge battery cell group on the basis of the information set in the control signal S2.

Figure 22:
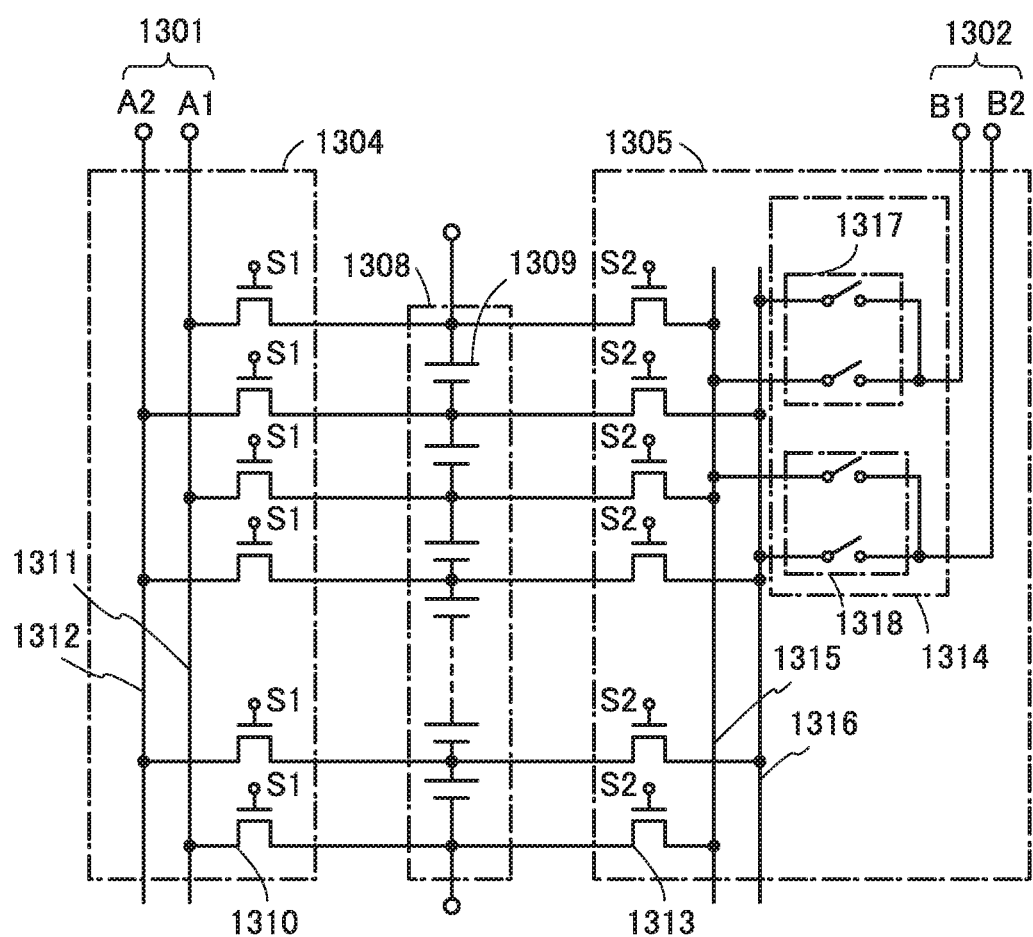
FIG. 22 is a circuit diagram showing one embodiment of the present invention.
Figure 23:
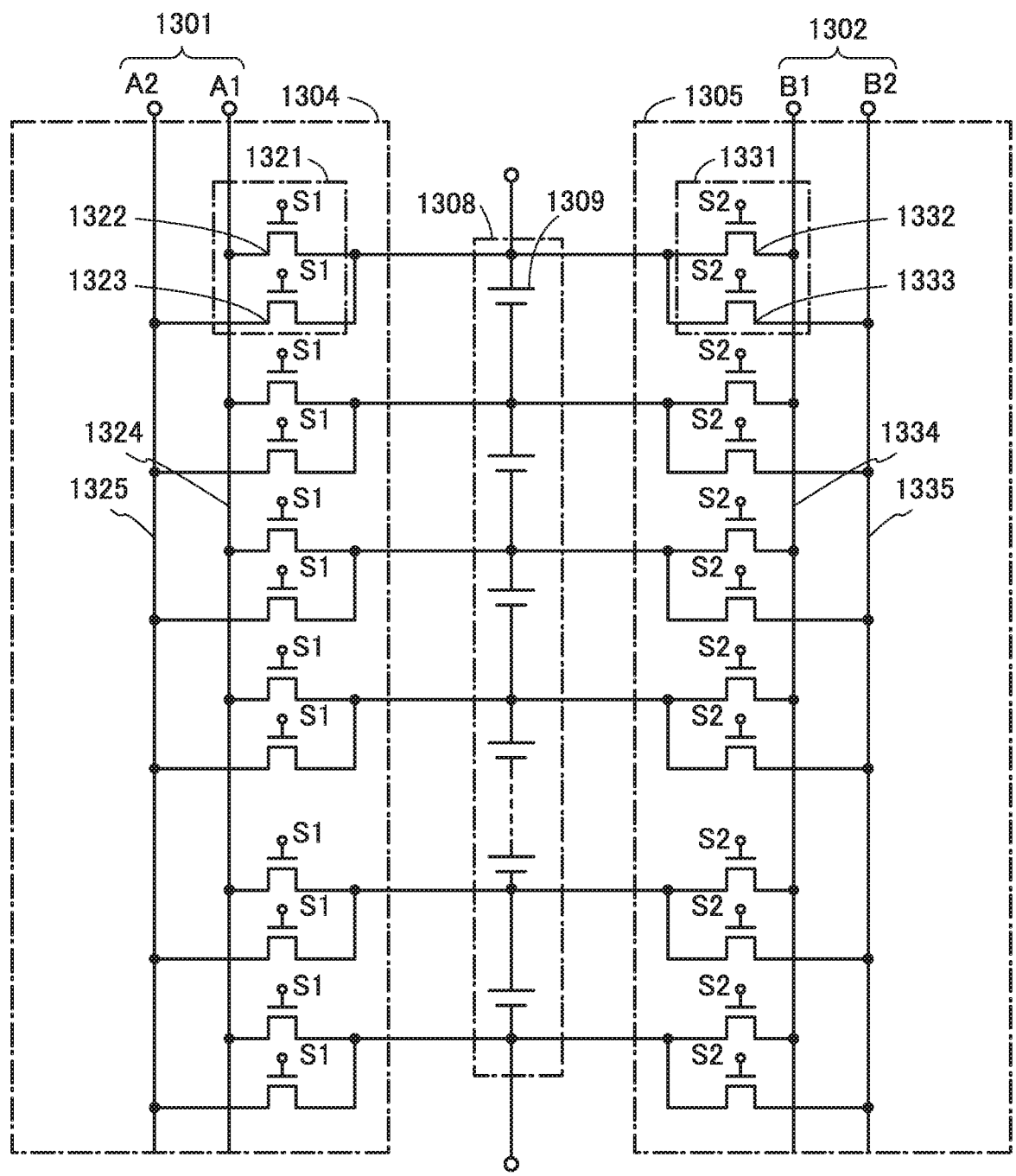
FIG. 23 is a circuit diagram showing one embodiment of the present invention.

FIG. 22 and FIG. 23 are circuit diagrams showing structure examples of the switching circuits 1304 and 1305.

In FIG. 22, the switching circuit 1304 includes a plurality of transistors 1310, a bus 1311, and a bus 1312. The bus 1311 is connected to the terminal A1. The bus 1312 is connected to the terminal A2. Sources or drains of the plurality of transistors 1310 are connected alternately to the bus 1311 and the bus 1312. Sources or drains which are not connected to the bus 1311 and the bus 1312 of the plurality of transistors 1310 are each connected between the two adjacent battery cells 1309.

A source or a drain of the transistor 1310 which is not connected to the bus 1311 on the most upstream side of the plurality of transistors 1310 is connected to a positive electrode terminal of the battery cell 1309 on the most upstream side of the battery portion 1308. A source or a drain of the transistor 1310 which is not connected to the bus 1311 on the most downstream side of the plurality of transistors 1310 is connected to a negative electrode terminal of the battery cell 1309 on the most downstream side of the battery portion 1308.

The switching circuit 1304 connects the discharge battery cell group to the terminal pair 1301 by bringing one of the plurality of transistors 1310 which are connected to the bus 1311 and one of the plurality of transistors 1310 which are connected to the bus 1312 into an on state in response to the control signal S1 supplied to gates of the plurality of transistors 1310. Accordingly, the positive electrode terminal of the battery cell 1309 on the most upstream side of the discharge battery cell group is connected to one of the pair of terminals A1 and A2. The negative electrode terminal of the battery cell 1309 on the most downstream side of the discharge battery cell group is connected to the other of the pair of terminals A1 and A2 (i.e., a terminal which is not connected to the positive electrode terminal).

OS transistors are preferably used as the transistors 1310. Since the off-state current of the OS transistor is small, the amount of electric charge leaking from the battery cells which do not belong to the discharge battery cell group can be reduced, and a reduction in capacity with the lapse of time can be suppressed. In addition, dielectric breakdown is unlikely to occur in the OS transistor when a high voltage is applied. Therefore, the battery cell 1309 and the terminal pair 1301, which are connected to the transistor 1310 in an off state, can be insulated from each other even when an output voltage of the discharge battery cell group is high.

In FIG. 22, the switching circuit 1305 includes a plurality of transistors 1313, a current control switch 1314, a bus 1315, and a bus 1316. The bus 1315 and the bus 1316 are provided between the plurality of transistors 1313 and the current control switch 1314. Sources or drains of the plurality of transistors 1313 are connected alternately to the bus 1315 and the bus 1316. Sources or drains which are not connected to the bus 1315 and the bus 1316 of the plurality of transistors 1313 are each connected between the two adjacent battery cells 1309.

A source or a drain of the transistor 1313 which is not connected to the bus 1315 on the most upstream side of the plurality of transistors 1313 is connected to the positive electrode terminal of the battery cell 1309 on the most upstream side of the battery portion 1308. A source or a drain of the transistor 1313 which is not connected to the bus 1315 on the most downstream side of the plurality of transistors 1313 is connected to the negative electrode terminal of the battery cell 1309 on the most downstream side of the battery portion 1308.

OS transistors are preferably used as the transistors 1313 like the transistors 1310. Since the off-state current of the OS transistor is small, the amount of electric charge leaking from the battery cells which do not belong to the charge battery cell group can be reduced, and a reduction in capacity due to the lapse of time can be suppressed. In addition, dielectric breakdown is unlikely to occur in the OS transistor when a high voltage is applied. Therefore, the battery cell 1309 and the terminal pair 1302, which are connected to the transistor 1313 in an off state, can be insulated from each other even when a voltage for charging the charge battery cell group is high.

The current control switch 1314 includes a switch pair 1317 and a switch pair 1318. Terminals on one end of the switch pair 1317 are connected to the terminal B1. Terminals on the other end of the switch pair 1317 are connected to two different buses. One switch is connected to the bus 1315, and the other switch is connected to the bus 1316. Terminals on one end of the switch pair 1318 are connected to the terminal B2. Terminals on the other end of the switch pair 1318 are connected to two different buses. One switch is connected to the bus 1315, and the other switch is connected to the bus 1316.

OS transistors are preferably used for the switches included in the switch pair 1317 and the switch pair 1318 like the transistors 1310 and 1313.

The switching circuit 1305 connects the charge battery cell group and the terminal pair 1302 by controlling the combination of on and off states of the transistors 1313 and the current control switch 1314 in response to the control signal S2.

For example, the switching circuit 1305 connects the charge battery cell group and the terminal pair 1302 in the following manner.

The switching circuit 1305 brings the transistor 1313 connected to the positive electrode terminal of the battery cell 1309 on the most upstream side of the charge battery cell group into an on state in response to the control signal S2 supplied to gates of the plurality of transistors 1313. In addition, the switching circuit 1305 brings the transistor 1313 connected to the negative electrode terminal of the battery cell 1309 on the most downstream side of the charge battery cell group into an on state in response to the control signal S2 supplied to the gates of the plurality of transistors 1313.

The polarities of voltages applied to the terminal pair 1302 can vary in accordance with the connection structures of the voltage transformer circuit 1307 and the discharge battery cell group connected to the terminal pair 1301. In order to supply current in a direction for charging the charge battery cell group, terminals having the same polarity of the terminal pair 1302 and the charge battery cell group are required to be connected. In view of this, the current control switch 1314 is controlled by the control signal S2 so that the connection destination of the switch pair 1317 and that of the switch pair 1318 are changed in accordance with the polarities of the voltages applied to the terminal pair 1302.

The state where voltages are applied to the terminal pair 1302 so as to make the terminal B1 a positive electrode and the terminal B2 a negative electrode is described as an example. In the case where the battery cell 1309 positioned on the most downstream side of the battery portion 1308 is in the charge battery cell group, the switch pair 1317 is controlled to be connected to the positive electrode terminal of the battery cell 1309 in response to the control signal S2. That is, the switch of the switch pair 1317 connected to the bus 1316 is turned on, and the switch of the switch pair 1317 connected to the bus 1315 is turned off. In contrast, the switch pair 1318 is controlled to be connected to the negative electrode terminal of the battery cell 1309 in response to the control signal S2. That is, the switch of the switch pair 1318 connected to the bus 1315 is turned on, and the switch of the switch pair 1318 connected to the bus 1316 is turned off. In this manner, terminals having the same polarity of the terminal pair 1302 and the charge battery cell group are connected to each other. In addition, the current which flows from the terminal pair 1302 is controlled to be supplied in a direction so as to charge the charge battery cell group.

In addition, instead of the switching circuit 1305, the switching circuit 1304 may include the current control switch 1314. In that case, the polarities of the voltages applied to the terminal pair 1302 are controlled by controlling the polarities of the voltages applied to the terminal pair 1301 in response to the operation of the current control switch 1314 and the control signal S1. The current control switch 1314 controls the direction of current which flows to the charge battery cell group from the terminal pair 1302.

FIG. 23 is a circuit diagram showing structure examples of the switching circuit 1304 and the switching circuit 1305 which are different from those in FIG. 22.

In FIG. 23, the switching circuit 1304 includes a plurality of transistor pairs 1321, a bus 1324, and a bus 1325. The bus 1324 is connected to the terminal A1. The bus 1325 is connected to the terminal A2. Terminals on one end of each of the plurality of transistor pairs 1321 are connected to two different buses. A source or a drain of a transistor 1322 is connected to the bus 1324. A source or a drain of a transistor 1323 is connected to the bus 1325. Terminals on the other end of each of the plurality of transistor pairs 1321 are connected between the two adjacent battery cells 1309. The terminals on the other end of the transistor pair 1321 on the most upstream side of the plurality of transistor pairs 1321 are connected to the positive electrode terminal of the battery cell 1309 on the most upstream side of the battery portion 1308. The terminals on the other end of the transistor pair 1321 on the most downstream side of the plurality of transistor pairs 1321 are connected to the negative electrode terminal of the battery cell 1309 on the most downstream side of the battery portion 1308.

The switching circuit 1304 switches the connection destination of the transistor pair 1321 to one of the terminal A1 and the terminal A2 by turning on or off the transistors 1322 and 1323 in response to the control signal S1. Specifically, when the transistor 1322 is turned on, the transistor 1323 is turned off, so that the connection destination of the transistor pair 1321 is the terminal A1. On the other hand, when the transistor 1323 is turned on, the transistor 1322 is turned off, so that the connection destination of the transistor pair 1321 is the terminal A2. Which of the transistors 1322 and 1323 is turned on is determined by the control signal S1.

Two transistor pairs 1321 are used to connect the terminal pair 1301 and the discharge battery cell group. Specifically, the connection destinations of the two transistor pairs 1321 are determined on the basis of the control signal S1, and the discharge battery cell group and the terminal pair 1301 are connected. The connection destinations of the two transistor pairs 1321 are controlled by the control signal S1 so that one of the connection destinations is the terminal A1 and the other is the terminal A2.

The switching circuit 1305 includes a plurality of transistor pairs 1331, a bus 1334, and a bus 1335. The bus 1334 is connected to the terminal B1. The bus 1335 is connected to the terminal B2. Terminals on one end of each of the plurality of transistor pairs 1331 are connected to two different buses. The terminal on one end connected via a transistor 1332 is connected to the bus 1334. The terminal on one end connected via a transistor 1333 is connected to the bus 1335. Terminals on the other end of each of the plurality of transistor pairs 1331 are connected between the two adjacent battery cells 1309. The terminals on the other end of the transistor pair 1331 on the most upstream side of the plurality of transistor pairs 1331 are connected to the positive electrode terminal of the battery cell 1309 on the most upstream side of the battery portion 1308. The terminals on the other end of the transistor pair 1331 on the most downstream side of the plurality of transistor pairs 1331 are connected to the negative electrode terminal of the battery cell 1309 on the most downstream side of the battery portion 1308.

The switching circuit 1305 switches the connection destination of the transistor pair 1331 to one of the terminal B1 and the terminal B2 by turning on or off the transistors 1332 and 1333 in response to the control signal S2. Specifically, when the transistor 1332 is turned on, the transistor 1333 is turned off, so that the connection destination of the transistor pair 1331 is the terminal B. On the other hand, when the transistor 1333 is turned on, the transistor 1332 is turned off, so that the connection destination of the transistor pair 1331 is the terminal B2. Which of the transistors 1332 and 1333 is turned on is determined by the control signal S2.

Two transistor pairs 1331 are used to connect the terminal pair 1302 and the charge battery cell group. Specifically, the connection destinations of the two transistor pairs 1331 are determined on the basis of the control signal S2, and the charge battery cell group and the terminal pair 1302 are connected. The connection destinations of the two transistor pairs 1331 are controlled by the control signal S2 so that one of the connection destinations is the terminal B1 and the other is the terminal B2.

The connection destinations of the two transistor pairs 1331 are determined by the polarities of the voltages applied to the terminal pair 1302. Specifically, in the case where voltages which make the terminal B1 a positive electrode and the terminal B2 a negative electrode are applied to the terminal pair 1302, the transistor pair 1331 on the upstream side is controlled by the control signal S2 so that the transistor 1332 is turned on and the transistor 1333 is turned off. In contrast, the transistor pair 1331 on the downstream side is controlled by the control signal S2 so that the transistor 1333 is turned on and the transistor 1332 is turned off. In the case where voltages which make the terminal B1 a negative electrode and the terminal B2 a positive electrode are applied to the terminal pair 1302, the transistor pair 1331 on the upstream side is controlled by the control signal S2 so that the transistor 1333 is turned on and the transistor 1332 is turned off. In contrast, the transistor pair 1331 on the downstream side is controlled by the control signal S2 so that the transistor 1332 is turned on and the transistor 1333 is turned off. In this manner, terminals having the same polarity of the terminal pair 1302 and the charge battery cell group are connected to each other. In addition, the current which flows from the terminal pair 1302 is controlled to be supplied in a direction so as to charge the charge battery cell group.

The voltage transformation control circuit 1306 controls an operation of the voltage transformer circuit 1307. The voltage transformation control circuit 1306 generates a voltage transformation signal S3 for controlling the operation of the voltage transformer circuit 1307 on the basis of the number of the battery cells 1309 included in the discharge battery cell group and the number of the battery cells 1309 included in the charge battery cell group and outputs the voltage transformation signal S3 to the voltage transformer circuit 1307.

In the case where the number of the battery cells 1309 included in the discharge battery cell group is larger than that included in the charge battery cell group, it is necessary to prevent a charging voltage which is too high from being applied to the charge battery cell group. Thus, the voltage transformation control circuit 1306 outputs the voltage transformation signal S3 for controlling the voltage transformer circuit 1307 so that a discharging voltage (Vdis) is lowered within a range where the charge battery cell group can be charged.

In the case where the number of the battery cells 1309 included in the discharge battery cell group is less than or equal to that included in the charge battery cell group, a voltage necessary for charging the charge battery cell group needs to be secured. Therefore, the voltage transformation control circuit 1306 outputs the voltage transformation signal S3 for controlling the voltage transformer circuit 1307 so that the discharging voltage (Vdis) is raised within a range where a charging voltage which is too high is not applied to the charge battery cell group.

The voltage value of the charging voltage which is too high is determined in the light of product specifications and the like of the battery cell 1309 used in the battery portion 1308. The voltage which is raised and lowered by the voltage transformer circuit 1307 is applied as a charging voltage (Vcha) to the terminal pair 1302.

Figure 24A:
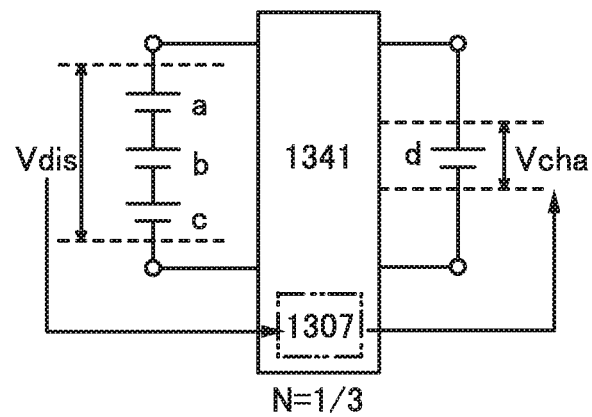
FIGS. 24A to 24C are schematic views each illustrating one embodiment of the present invention.
Figure 24B:
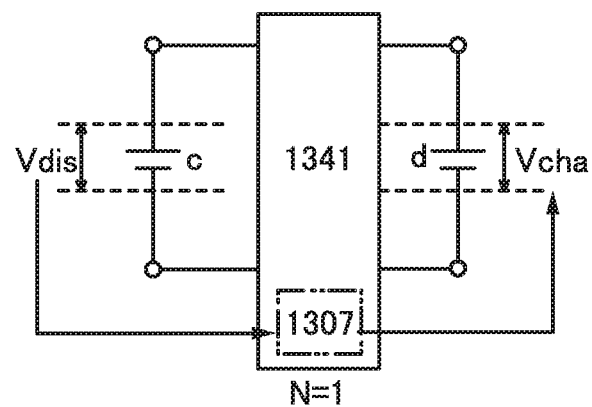
Figure 24C:
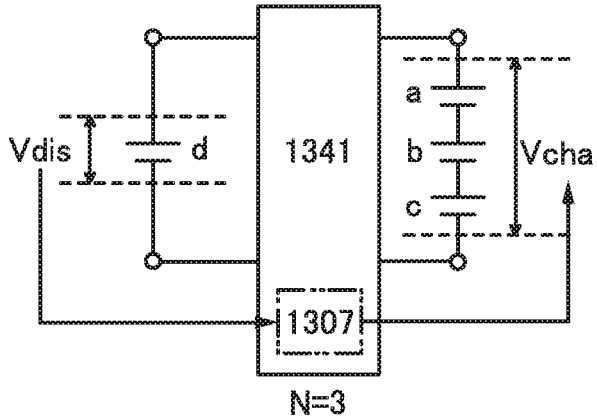

Operation examples of the voltage transformation control circuit 1306 in this embodiment are described with reference to FIGS. 24A to 24C. FIGS. 24A to 24C are schematic views illustrating the operation examples of the voltage transformation control circuit 1306 corresponding to the discharge battery cell group and the charge battery cell group described with reference to FIGS. 21A to 21C. FIGS. 24A to 24C each illustrate a battery control unit 1341. The battery control unit 1341 includes the terminal pair 1301, the terminal pair 1302, the switching control circuit 1303, the switching circuit 1304, the switching circuit 1305, the voltage transformation control circuit 1306, and the voltage transformer circuit 1307.

In the example illustrated in FIG. 24A, the series of three high-voltage cells 1309*a* to 1309*c* and one low-voltage cell 1309*d* are connected in series as illustrated in FIG. 21A. In that case, as described with reference to FIG. 21A, the switching control circuit 1303 selects the high-voltage cells 1309*a* to 1309*c* as the discharge battery cell group, and selects the low-voltage cell 1309*d* as the charge battery cell group. The voltage transformation control circuit 1306 calculates a conversion ratio N for converting the discharging voltage (Vdis) into the charging voltage (Vcha) on the basis of the ratio of the number of the battery cells 1309 included in the charge battery cell group to the number of the battery cells 1309 included in the discharge battery cell group.

In the case where the number of the battery cells 1309 included in the discharge battery cell group is larger than that included in the charge battery cell group, when a discharging voltage is applied to the terminal pair 1302 without transforming the voltage, overvoltage may be applied to the battery cells 1309 included in the charge battery cell group through the terminal pair 1302. Thus, in the case of FIG. 24A, it is necessary that the charging voltage (Vcha) applied to the terminal pair 1302 be lower than the discharging voltage. In addition, in order to charge the charge battery cell group, it is necessary that the charging voltage be higher than the total voltage of the battery cells 1309 included in the charge battery cell group. Thus, the voltage transformation control circuit 1306 sets the conversion ratio N larger than the ratio of the number of the battery cells 1309 included in the charge battery cell group to the number of the battery cells 1309 included in the discharge battery cell group.

The voltage transformation control circuit 1306 preferably sets the conversion ratio N larger than the ratio of the number of the battery cells 1309 included in the charge battery cell group to the number of the battery cells 1309 included in the discharge battery cell group by about 1% to 10%. The charging voltage is made larger than the voltage of the charge battery cell group, but the charging voltage is equal to the voltage of the charge battery cell group in reality. Note that the voltage transformation control circuit 1306 feeds a current for charging the charge battery cell group in accordance with the conversion ratio N in order to make the voltage of the charge battery cell group equal to the charging voltage. The value of the current is set by the voltage transformation control circuit 1306.

In the example illustrated in FIG. 24A, since the number of the battery cells 1309 included in the discharge battery cell group is three and the number of the battery cells 1309 included in the charge battery cell group is one, the voltage transformation control circuit 1306 calculates a value which is slightly larger than ⅓ as the conversion ratio N. Then, the voltage transformation control circuit 1306 outputs the voltage transformation signal S3, which lowers the discharging voltage in accordance with the conversion ratio N and converts the voltage into a charging voltage, to the voltage transformer circuit 1307. The voltage transformer circuit 1307 applies the charging voltage which is obtained by transformation in response to the voltage transformation signal S3 to the terminal pair 1302. Then, the battery cells 1309 included in the charge battery cell group are charged with the charging voltage applied to the terminal pair 1302.

In each of the examples illustrated in FIGS. 24B and 24C, the conversion ratio N is calculated in a manner similar to that of FIG. 24A. In each of the examples illustrated in FIGS. 24B and 24C, since the number of the battery cells 1309 included in the discharge battery cell group is less than or equal to the number of the battery cells 1309 included in the charge battery cell group, the conversion ratio N is 1 or more. Therefore, in that case, the voltage transformation control circuit 1306 outputs the voltage transformation signal S3 for raising the discharging voltage and converting the voltage into the charging voltage.

The voltage transformer circuit 1307 converts the discharging voltage applied to the terminal pair 1301 into the charging voltage on the basis of the voltage transformation signal S3. The voltage transformer circuit 1307 applies the converted charging voltage to the terminal pair 1302. The voltage transformer circuit 1307 electrically insulates the terminal pair 1301 from the terminal pair 1302. Accordingly, the voltage transformer circuit 1307 prevents a short circuit due to a difference between the absolute voltage of the negative electrode terminal of the battery cell 1309 on the most downstream side of the discharge battery cell group and the absolute voltage of the negative electrode terminal of the battery cell 1309 on the most downstream side of the charge battery cell group. Furthermore, the voltage transformer circuit 1307 converts the discharging voltage, which is the total voltage of the discharge battery cell group, into the charging voltage on the basis of the voltage transformation signal S3 as described above.

An insulated direct current (DC)-DC converter or the like can be used for the voltage transformer circuit 1307. In that case, the voltage transformation control circuit 1306 controls the charging voltage converted by the voltage transformer circuit 1307 by outputting a signal for controlling the on/off ratio (the duty ratio) of the insulated DC-DC converter as the voltage transformation signal S3.

Examples of the insulated DC-DC converter include a flyback converter, a forward converter, a ringing choke converter (RCC), a push-pull converter, a half-bridge converter, and a full-bridge converter, and a suitable converter is selected in accordance with the value of the intended output voltage.

Figure 25:
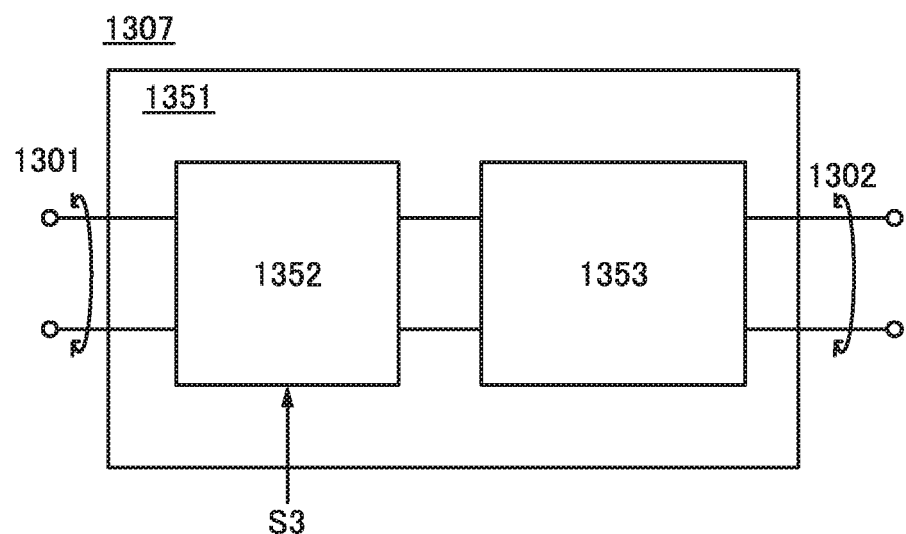
FIG. 25 is a block diagram showing one embodiment of the present invention.

The structure of the voltage transformer circuit 1307 including the insulated DC-DC converter is shown in FIG. 25. An insulated DC-DC converter 1351 includes a switch portion 1352 and a transformer 1353. The switch portion 1352 is a switch for switching on/off of the insulated DC-DC converter, and a metal oxide semiconductor field-effect transistor (MOSFET), a bipolar transistor, or the like is used as the switch portion 1352. The switch portion 1352 periodically turns on and off the insulated DC-DC converter 1351 in accordance with the voltage transformation signal S3 controlling the on/off ratio which is output from the voltage transformation control circuit 1306. The switch portion 1352 can have any of various structures in accordance with the type of the insulated DC-DC converter which is used. The transformer 1353 converts the discharging voltage applied from the terminal pair 1301 into the charging voltage. In detail, the transformer 1353 operates in synchronization with the on/off state of the switch portion 1352 and converts the discharging voltage into the charging voltage in accordance with the on/off ratio. As the time during which the switch portion 1352 is on becomes longer in its switching period, the charging voltage is higher. On the other hand, as the time during which the switch portion 1352 is on becomes shorter in its switching period, the charging voltage is lower. In the case where the insulated DC-DC converter is used, the terminal pair 1301 and the terminal pair 1302 can be insulated from each other inside the transformer 1353.

Figure 26:
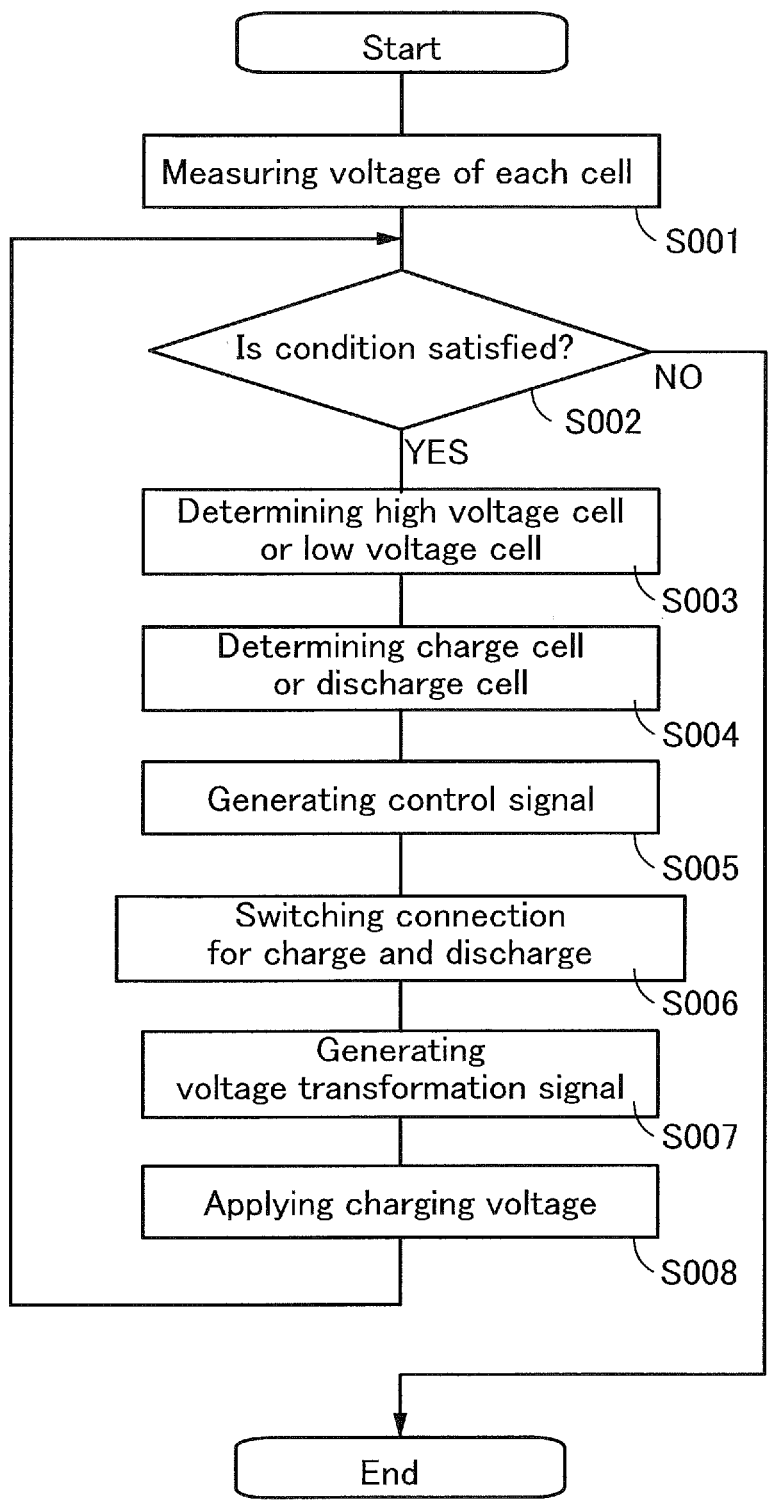
FIG. 26 is a flow chart showing one embodiment of the present invention.

A flow of an operation of the power storage device 1300 in this embodiment is described with reference to FIG. 26. FIG. 26 is a flow chart showing the flow of the operation of the power storage device 1300.

First, the power storage device 1300 obtains a voltage measured for each of the plurality of battery cells 1309 (step S001). Then, the power storage device 1300 determines whether or not the condition for starting the operation of reducing variation in voltages of the plurality of battery cells 1309 is satisfied (step S002). An example of the condition can be that the difference between the maximum value and the minimum value of the voltages measured for the plurality of battery cells 1309 is higher than or equal to the predetermined threshold value. In the case where the condition is not satisfied (step S002: NO), the power storage device 1300 does not perform the following operation because voltages of the battery cells 1309 are well balanced. In contrast, in the case where the condition is satisfied (step S002: YES), the power storage device 1300 performs the operation of reducing variation in the voltages of the battery cells 1309. In this operation, the power storage device 1300 determines whether each battery cell 1309 is a high-voltage cell or a low-voltage cell on the basis of the measured voltage of each cell (step S003). Then, the power storage device 1300 determines a discharge battery cell group and a charge battery cell group on the basis of the determination results (step S004). In addition, the power storage device 1300 generates the control signal S1 for setting the determined discharge battery cell group as the connection destination of the terminal pair 1301, and the control signal S2 for setting the determined charge battery cell group as the connection destination of the terminal pair 1302 (step S005). The power storage device 1300 outputs the generated control signals S1 and S2 to the switching circuit 1304 and the switching circuit 1305, respectively. Then, the switching circuit 1304 connects the terminal pair 1301 and the discharge battery cell group, and the switching circuit 1305 connects the terminal pair 1302 and the discharge battery cell group (step S006). The power storage device 1300 generates the voltage transformation signal S3 on the basis of the number of the battery cells 1309 included in the discharge battery cell group and the number of the battery cells 1309 included in the charge battery cell group (step S007). Then, the power storage device 1300 converts the discharging voltage applied to the terminal pair 1301 into the charging voltage on the basis of the voltage transformation signal S3 and applies the charging voltage to the terminal pair 1302 (step S008). In this way, electric charge of the discharge battery cell group is moved to the charge battery cell group.

Although the plurality of steps are shown in order in the flow chart of FIG. 26, the order of performing the steps is not limited to that order.

As described above, in this embodiment, when electric charge is moved from the discharge battery cell group to the charge battery cell group, a structure in which electric charge from the discharge battery cell group is temporarily stored and the stored electric charge is sent to the charge battery cell group is unnecessary, unlike in a capacitor type circuit. Accordingly, the charge transfer efficiency per unit time can be increased. In addition, the switching circuit 1304 and the switching circuit 1305 can determine which battery cell in the discharge battery cell group and the charge battery cell group to be connected to the transformer circuit.

Furthermore, the voltage transformer circuit 1307 converts the discharging voltage applied to the terminal pair 1301 into the charging voltage on the basis of the number of the battery cells 1309 included in the discharge battery cell group and the number of the battery cells 1309 included in the charge battery cell group, and applies the charging voltage to the terminal pair 1302. Thus, electric charge can be transferred without any problems regardless of how the battery cells 1309 are selected as the discharge battery cell group and the charge battery cell group.

Furthermore, the use of OS transistors as the transistor 1310 and the transistor 1313 can reduce the amount of electric charge leaking from the battery cells 1309 which do not belong to the charge battery cell group and the discharge battery cell group. Accordingly, a decrease in capacity of the battery cells 1309 which do not contribute to charging and discharging can be suppressed. In addition, variation in characteristics of the OS transistor due to heat is smaller than that of a Si transistor. Accordingly, even when the temperature of the battery cells 1309 is increased, an operation such as turning on or off the transistors in response to the control signals S1 and S2 can be performed normally.

This application is based on Japanese Patent Application serial no. 2015-010559 filed with Japan Patent Office on Jan. 22, 2015, the entire contents of which are hereby incorporated by reference.

What is claimed is:

1. A secondary battery comprising:
   an exterior body comprising a metal film and a cushioning material;
   an electrode group comprising a positive electrode, a separator, and a negative electrode; and
   an electrolyte,
   wherein the cushioning material is on a periphery of the electrode group,
   wherein the cushioning material is in a seal region of the exterior body,
   wherein an edge face of the cushioning material is exposed at a side surface of the secondary battery,
   wherein the edge face faces a first direction,
   wherein the metal film extends beyond the edge face of the cushioning material in the first direction,
   wherein the elastic modulus of the cushioning material is higher than the elastic modulus of the separator,
   wherein the electrode group is surrounded by the cushioning material,
   wherein the cushioning material is in contact with the electrolyte, and
   wherein the cushioning material is provided to reduce a level difference between the seal region and a region where the electrode group is provided.

2. The secondary battery according to claim 1, wherein a thickness of the cushioning material is greater than or equal to 90% and less than or equal to 110% of a thickness of the electrode group.

3. The secondary battery according to claim 1, wherein the cushioning material has flexibility.

4. The secondary battery according to claim 1, wherein the cushioning material comprises an elastic body.

5. The secondary battery according to claim 1, wherein the metal film is embossed.

6. An electronic device comprising:
   the secondary battery according to claim 1; and
   at least one of a display device, a housing, a speaker, a microphone, and an operation button.

7. A secondary battery comprising:
   an exterior body comprising a metal film, a first cushioning material, a second cushioning material and a third cushioning material;
   an electrode group comprising a positive electrode, a separator, and a negative electrode; and
   an electrolyte,
   wherein the first cushioning material is on a first periphery of the electrode group,
   wherein the second cushioning material is on a second periphery facing the first periphery of the electrode group,
   wherein the third cushioning material is on a third periphery of the electrode group,
   wherein each of the first cushioning material, the second cushioning material, and the third cushioning material is in a seal region of the exterior body, wherein an edge face of the first cushioning material is exposed at a side surface of the secondary battery, wherein the edge face of the first cushioning material faces a first direction, wherein the metal film extends beyond the edge face of the first cushioning material in the first direction, wherein an edge face of the second cushioning material is exposed at a second side surface of the secondary battery, wherein the edge face of the second cushioning material faces a second direction, wherein the metal film extends beyond the edge face of the second cushioning material in the second direction, wherein each of the elastic moduli of the first cushioning material and the second cushioning material is higher than the elastic modulus of the separator, wherein the electrode group is surrounded by the first cushioning material, the second cushioning material, and the third cushioning material, wherein the first cushioning material, the second cushioning material and the third cushioning material are in contact with the electrolyte, respectively, and wherein each of the first cushioning material, the second cushioning material, and the third cushioning material is provided to reduce a level difference between the seal region and a region where the electrode group is provided.

8. The secondary battery according to claim 7, wherein a lead electrode is provided in the third periphery of the electrode group.

9. The secondary battery according to claim 7, wherein a thickness of each of the first cushioning material, the second cushioning material, and the third cushioning material is greater than or equal to 90% and less than or equal to 110% of a thickness of the electrode group.

10. The secondary battery according to claim 7, wherein each of the first cushioning material, the second cushioning material, and the third cushioning material has flexibility.

11. The secondary battery according to claim 7, wherein each of the first cushioning material, the second cushioning material, and the third cushioning material comprises an elastic body.

12. The secondary battery according to claim 7, wherein the metal film is embossed.

13. An electronic device comprising:
the secondary battery according to claim 7; and
at least one of a display device, a housing, a speaker, a microphone, and an operation button.

14. A secondary battery comprising:
an exterior body comprising a metal film and a cushioning material;
an electrode group comprising a positive electrode, a separator, and a negative electrode; and
an electrolyte,
wherein the cushioning material is on a periphery of the electrode group,
wherein an edge face of the cushioning material is exposed at a side surface of the secondary battery,
wherein the edge face faces a first direction,
wherein the cushioning material comprises rubber,
wherein the cushioning material is in a seal region of the exterior body,
wherein the metal film extends beyond the edge face of the cushioning material in the first direction,
wherein the electrode group is surrounded by the cushioning material,
wherein the cushioning material is in contact with the electrolyte, and
wherein the cushioning material is provided to reduce a level difference between the seal region and a region where the electrode group is provided.

15. The secondary battery according to claim 14, wherein three sides of the electrode group are surrounded by the cushioning material.

16. The secondary battery according to claim 14, wherein a thickness of the cushioning material is greater than or equal to 90% and less than or equal to 110% of a thickness of the electrode group.

17. The secondary battery according to claim 14, wherein the cushioning material has flexibility.

18. The secondary battery according to claim 14, wherein the metal film is embossed.

19. An electronic device comprising:
the secondary battery according to claim 14; and
at least one of a display device, a housing, a speaker, a microphone, and an operation button.

20. The secondary battery according to claim 1, wherein the cushioning material comprises rubber.

21. The secondary battery according to claim 1, wherein the cushioning material comprises silicone rubber.

* * * * *